United States Patent [19]
Cheong et al.

[11] Patent Number: 5,805,906
[45] Date of Patent: Sep. 8, 1998

[54] METHOD AND APPARATUS FOR WRITING INFORMATION TO REGISTERS IN A DATA PROCESSING SYSTEM USING A NUMBER OF REGISTERS FOR PROCESSING INSTRUCTIONS

[75] Inventors: Hoichi Cheong; Hung Qui Le; Paul Joseph Jordan, all of Austin, Tex.

[73] Assignee: International Business Machines Corporation, Armonk, N.Y.

[21] Appl. No.: 729,308

[22] Filed: Oct. 15, 1996

[51] Int. Cl.⁶ .................................................... G06F 9/46
[52] U.S. Cl. ............................................................ 395/733
[58] Field of Search .................... 395/587, 392, 395/733

[56] References Cited

U.S. PATENT DOCUMENTS

| | | | |
|---|---|---|---|
| 3,789,365 | 1/1974 | Jen ........................................ | 395/737 |
| 5,075,840 | 12/1991 | Grohoski et al. .................. | 395/800.23 |
| 5,261,071 | 11/1993 | Lyon ....................................... | 711/140 |
| 5,345,569 | 9/1994 | Tran ........................................ | 395/393 |
| 5,355,457 | 10/1994 | Shebanow et al. ..................... | 395/394 |
| 5,363,495 | 11/1994 | Fry et al. .............................. | 395/555 |
| 5,374,916 | 12/1994 | Chu ..................................... | 341/146.2 |
| 5,467,087 | 11/1995 | Chu .......................................... | 341/51 |
| 5,485,544 | 1/1996 | Nonaka ..................................... | 395/12 |
| 5,500,943 | 3/1996 | Ho et al. .................................. | 395/394 |
| 5,577,248 | 11/1996 | Chambers ................................ | 395/601 |
| 5,581,775 | 12/1996 | Katz ......................................... | 395/587 |
| 5,586,294 | 12/1996 | Goodwin ................................. | 395/464 |

OTHER PUBLICATIONS

Organization of the Motorola 88110 Superscaler RISC Microprocessor, *IEEE Micro Journal*, Apr. 92, pp. 40–63, particularly p. 49.

"The Role of Exception Recovery", *Superscalar Microprocessor Design*, 92 (1991), pp. 87–102.

*Primary Examiner*—David Y. Eng
*Attorney, Agent, or Firm*—Anthony V. S. England

[57] ABSTRACT

In a data processing system using a number of registers for processing instructions, a method and apparatus for writing information to the registers. Ports are accessed for writing back to processor registers, information ("results") resulting from and associated with executing instructions. Certain of the results are stored for restoring to the registers. In response to an interruption at least one of the ports is accessed for restoring stored results to the registers. Accesses to the ports are arbitrated in response to comparing writeback and restoration results. A result includes identification of the instruction the result is associated with (a "TID"), and a register that is targeted by the result (a "TR"). The comparing includes comparing TID's and TR's for the results.

12 Claims, 19 Drawing Sheets

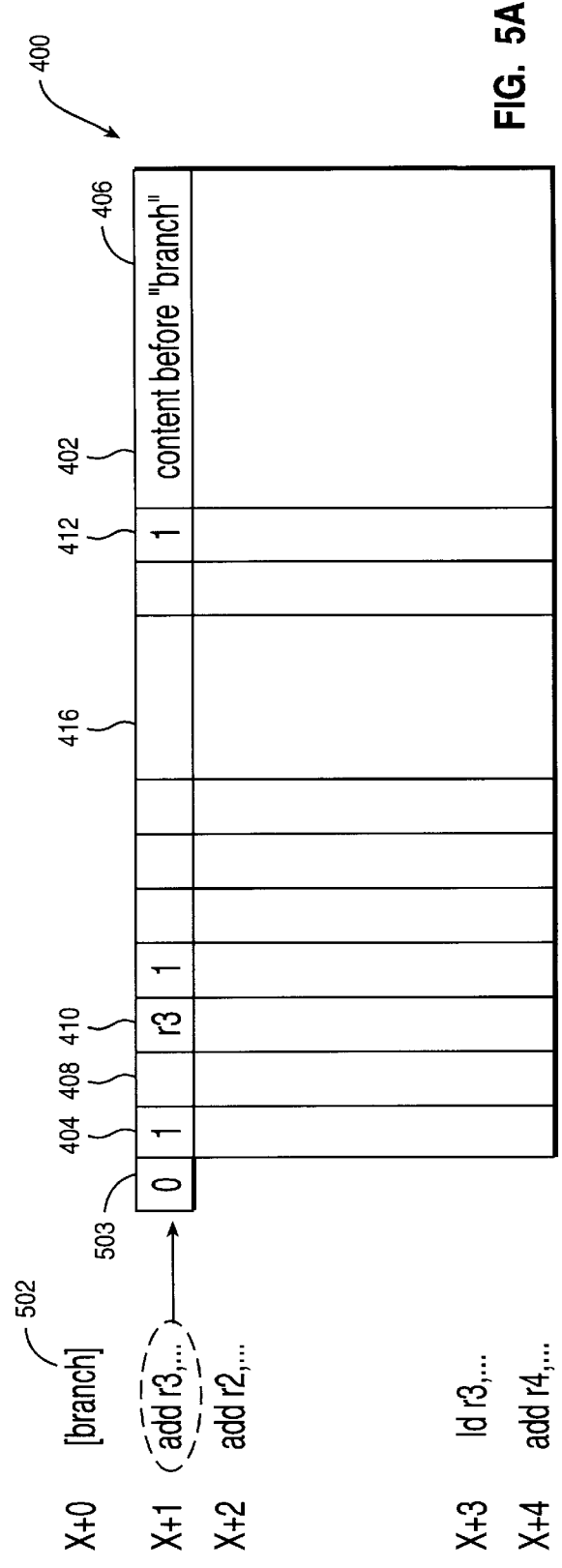

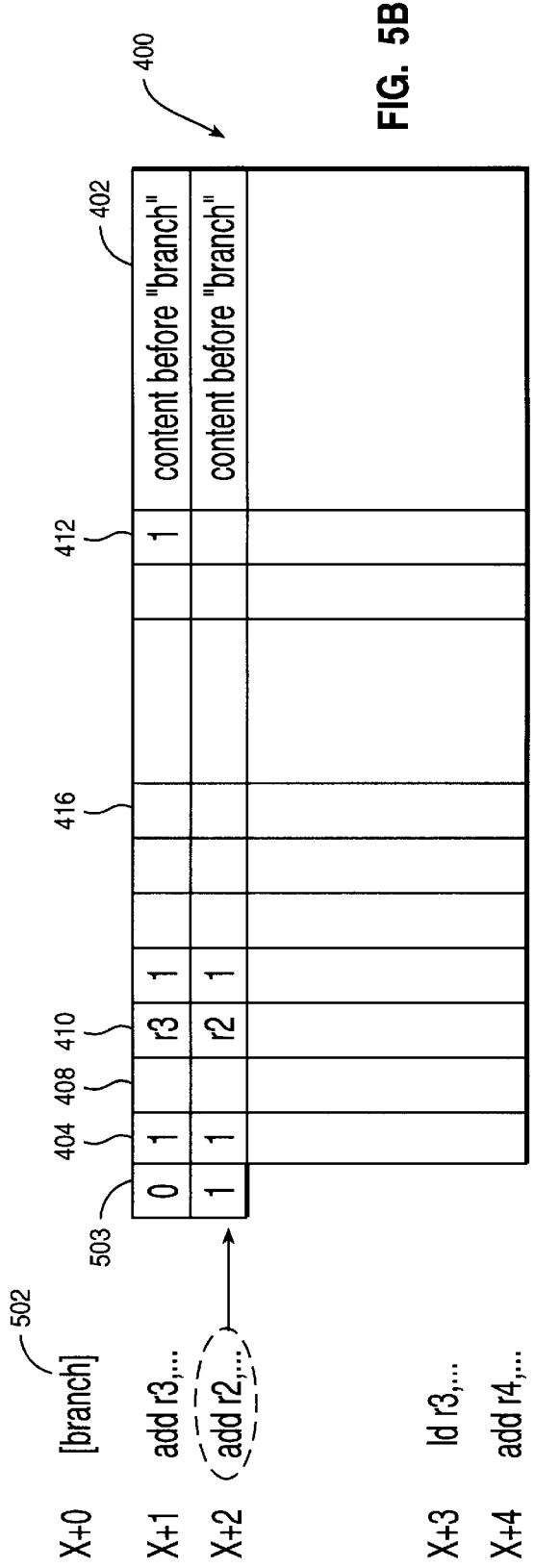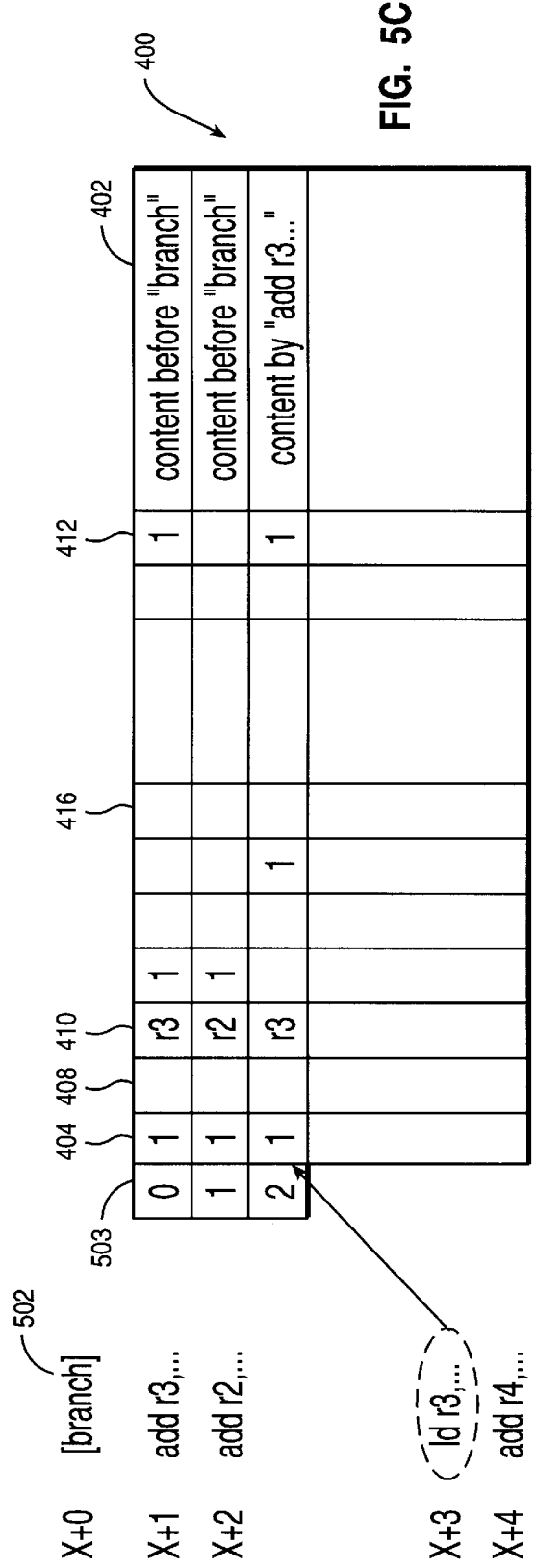

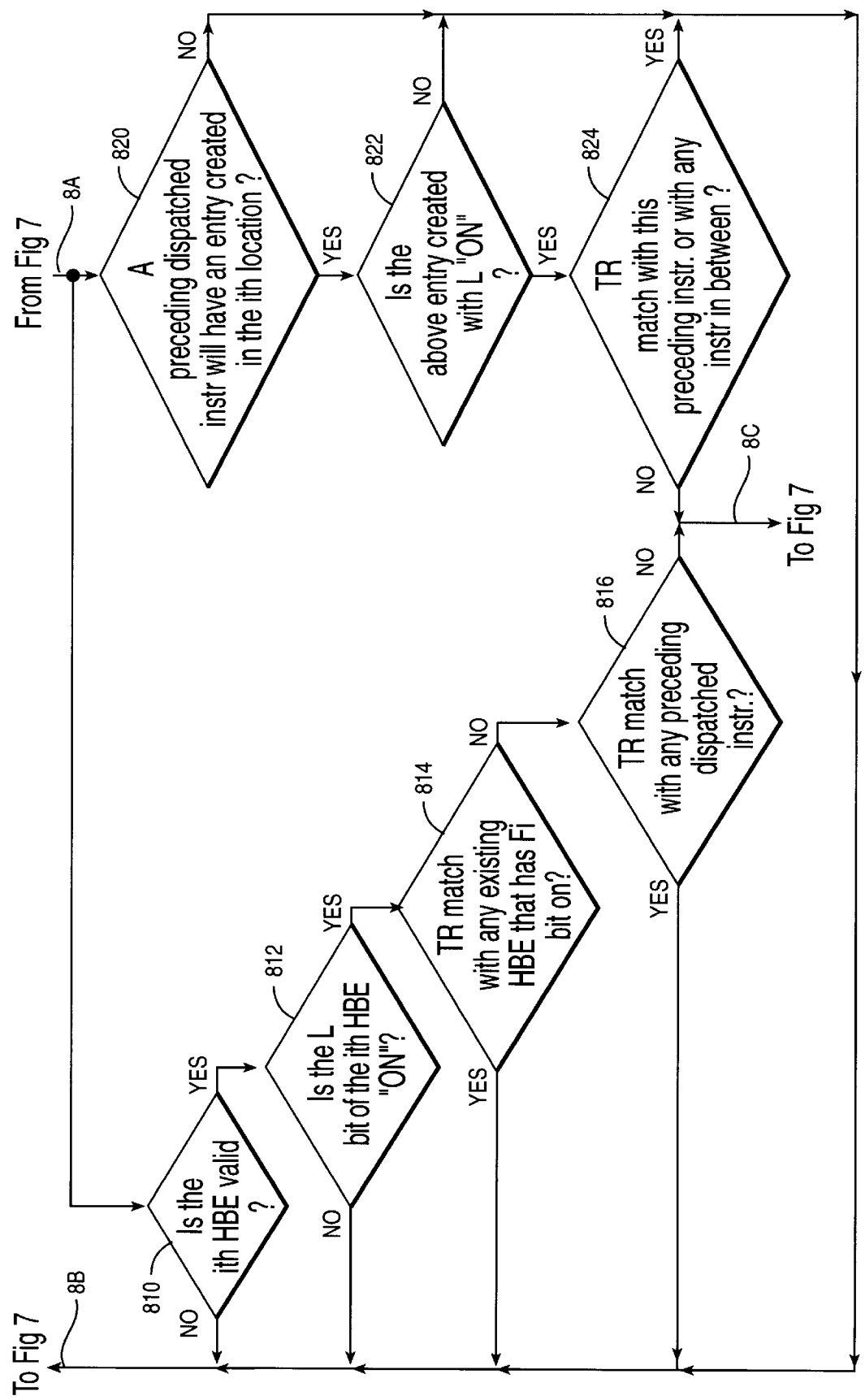

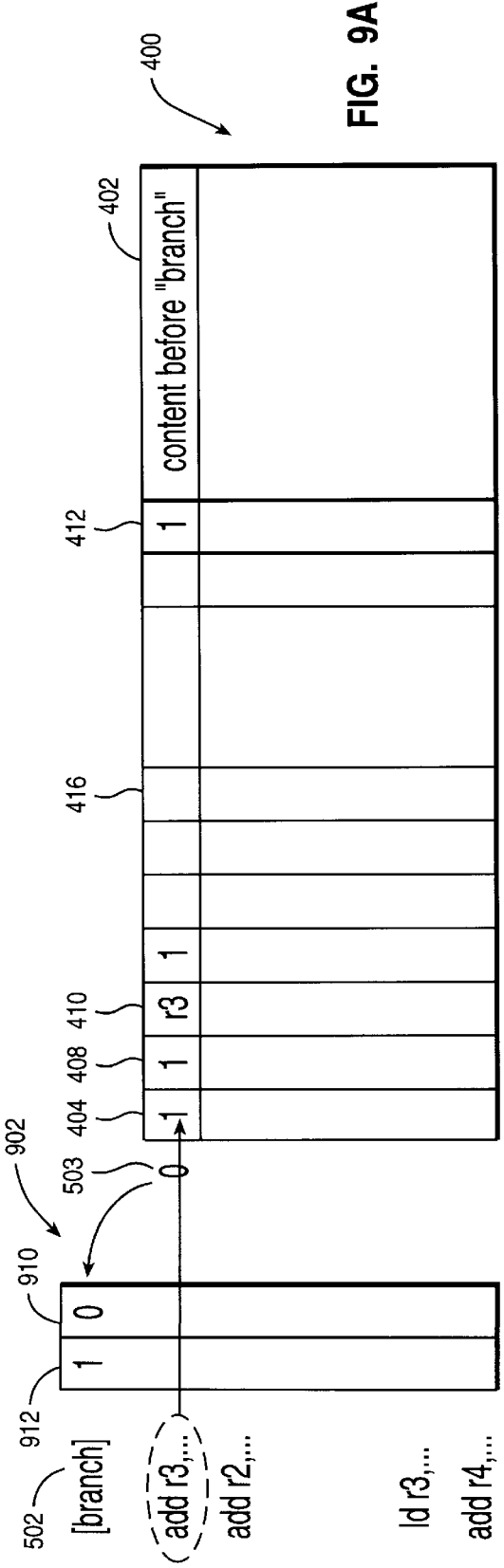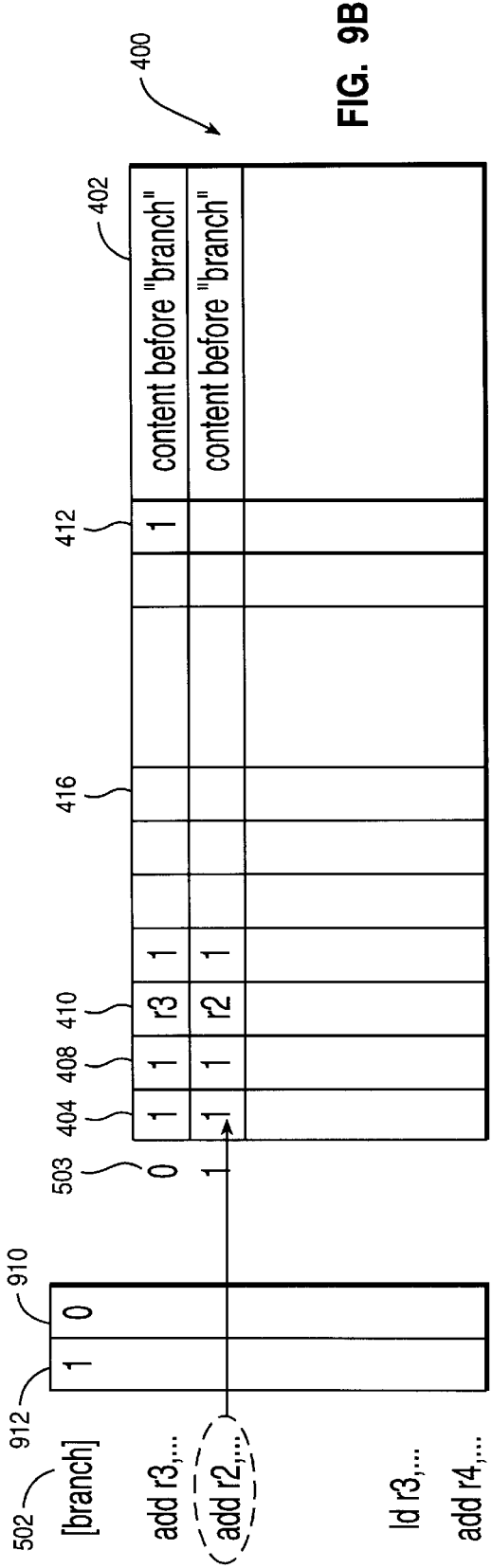

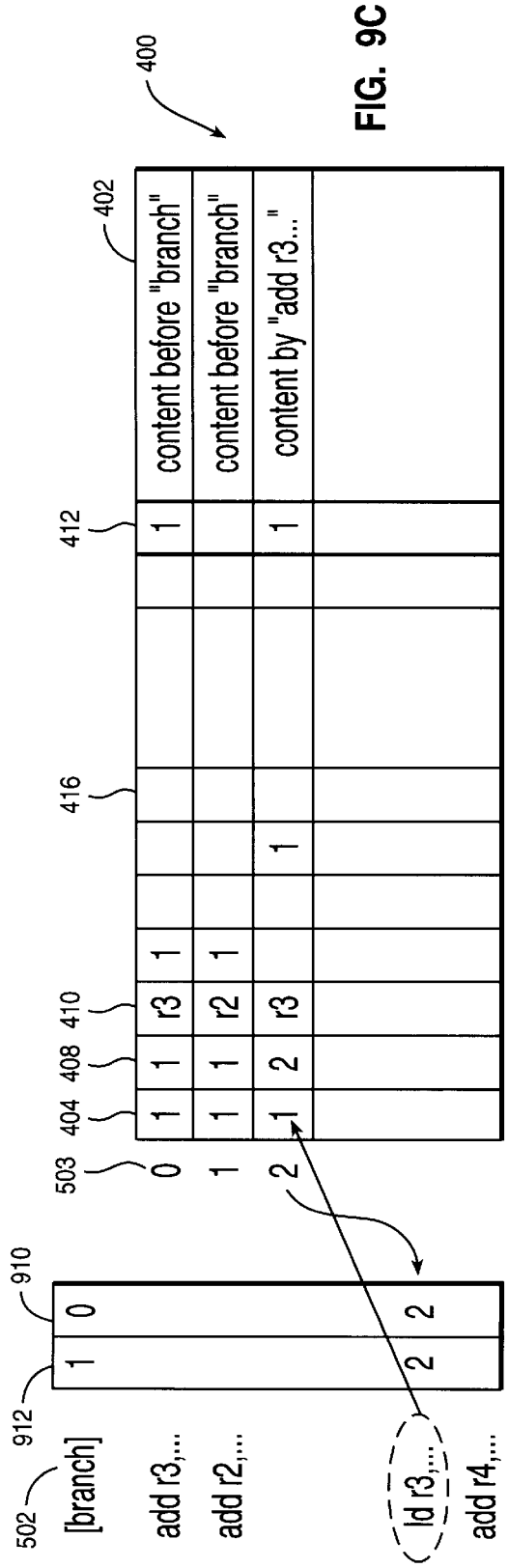

|  | TID match | TID no match |
|---|---|---|
| Register match | WB priority (disable HB) | HB priority (disable WB) |
| Register No match | WB priority | WB priority |

FIG. 13

METHOD AND APPARATUS FOR WRITING INFORMATION TO REGISTERS IN A DATA PROCESSING SYSTEM USING A NUMBER OF REGISTERS FOR PROCESSING INSTRUCTIONS

FIELD OF THE INVENTION

This invention relates generally to data processing systems and more specifically applies to recovery mechanisms for such systems, particularly where the system includes a processor that is superscalar or has a pipelined execution unit.

CROSS REFERENCE TO RELATED PATENT APPLICATIONS

This and the following applications for patent are related and filed on the same date:
METHOD AND APPARATUS FOR IMPROVED RECOVERY OF PROCESSOR STATE USING HISTORY BUFFER, U.S. patent application Ser. No. 08/729,307.
METHOD AND APPARATUS FOR CONDENSED HISTORY BUFFER, U.S. patent application Ser. No. 08/729, 307.

BACKGROUND OF THE INVENTION AND PRIOR ART

High performance processors currently used in data processing systems today may be capable of "superscalar" operation and may have "pipelined" elements. A superscalar processor has multiple elements which operate in parallel to process multiple instructions in a single processing cycle. Pipelining involves processing instructions in stages, so that the pipelined stages may process a number of instructions concurrently.

In a typical first stage, referred to as an "instruction fetch" stage, an instruction is fetched from memory. Then, in a "decode" stage, the instruction is decoded into different control bits, which in general designate i) a type of functional unit for performing the operation specified by the instruction, ii) source operands for the operation and iii) destinations for results of operations. Next, in a "dispatch" stage, the decoded instruction is dispatched per the control bits to a unit having an "execution" stage. This stage processes the operation as specified by the instruction. Executing an operation specified by an instruction includes accepting one or more operands and producing one or more results.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In the completion stage an instruction waits for the point at which there is no longer a possibility of an interrupt so that depositing its results will not violate the program order, at which point the instruction is considered "complete", as the term is used herein. Associated with a completion stage, there are buffers to hold execution results before results are deposited into the destination register, and buffers to backup content of registers at specified checkpoints in case an interrupt needs to revert the register content to its pre-checkpoint value. Either or both types of buffers can be employed in a particular implementation. At completion, the results of execution in the holding buffer will be deposited into the destination register and the backup buffer will be released.

While instructions for the above described processor may originally be prepared for processing in some programmed, logical sequence, it should be understood that they may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed concurrently or the dependent instruction is to be processed before the first instruction, an assumption must be made regarding the result produced by the first instruction. The "state" of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. (Herein, an instruction for which an assumption has been made is referred to as an "interruptible instruction", and the determination that an assumption is incorrect, triggering the need for the processor state to recover to a prior state, is referred to as an "interruption" or an "interrupt point".) In addition to incorrect assumptions, there are other causes of such interruptions requiring recovery of the processor state. Such an interruption is generally caused by an unusual condition arising in connection with instruction execution, error, or signal external to the processor.

It is known to use buffers associated with a processor for saving a processor state before an interruptible instruction, so that if an interrupt occurs, control logic may recover the processor state to the interrupt point by restoring the content of registers.

FIG. 1 is a block diagram of such a processor 10, which includes various units, registers, buffers and other sections formed by integrated circuitry. In the processor 10, a system bus 11 is connected to a bus interface unit ("BIU") 12 which controls information transfer between the processor 10 and the system bus 11. BIU 12 is connected to cache 14 which outputs instructions to a logic unit 18. In response to the instructions from cache 14, logic unit 18 selectively outputs instructions to other circuitry of processor 10, including multiple functional units (shown collectively as units 20). The functional units 20 input their source operand information, for executing the instructions, from architected registers in register file 32, and from rename buffers 34. The functional units 20 output information resulting from executing the instructions for storage at selected entries in rename buffers 34.

As information is stored at a selected one of rename buffers 34, such information is associated with a storage location, such as an architected register in register file 32, as specified by the instruction for which the selected rename buffer 34 is allocated. Information stored at a selected one of rename buffers 34 is copied ("written back") to its associated register in response to signals from logic unit 18, the signals being in response to completing the instruction that generated the information.

According to this processor 10 architecture, the registers in the register file 32 always contain results for the most recently completed instruction. Since results are stored in the rename buffers 34 until completion, any interruption which requires cancellation of executed instructions may be handled in the buffers 34 without affecting the registers 32.

Contrasted with the architecture of the processor in FIG. 1, in a processor which uses a history buffer for storing results of instruction execution, results of dispatched instructions are written back to the registers prior to completing the instructions. The registers, therefore, contain the results of the most recently dispatched instructions, and if an interruption occurs, the registers must be restored with results from the history buffer. Since, with this architecture, results may be written to the register file from the history buffer as well as the functional units, a conflict may arise when a register file port is accessed for restoring a result from the history buffer while the port is also accessed for writing back a result from a functional unit for a recently dispatched instruction.

SUMMARY OF THE INVENTION

An objective of the invention is to arbitrate access to register file ports.

It is another objective to restore results to registers in response to an interruption, without blocking concurrent processing.

According to the present invention, the foregoing and other objects are attained in a data processing system using a number of registers for processing instructions, by a method and apparatus for writing information to the registers. A number of the ports are accessed for writing back to processor registers, information ("results") resulting from and associated with executing instructions. Certain of the results are stored for restoring to the registers. In response to an interruption at least one of the ports is accessed for restoring stored results to the registers.

In another aspect, accesses to the ports are arbitrated in response to comparing writeback and restoration results. That is, if a port is busy writing a writeback result to a register, the port cannot be used for writing a restoration result. And, likewise, if a port is busy writing a restoration result, it cannot be used for writing a writeback result. Therefore, competing accesses must be arbitrated. Furthermore, a functional unit, for executing instructions, has access to only a single port for writing back to the registers the results from and associated with executing the instructions. But, due to the configuration of selection and control logic, stored results may be restored to the registers by any of the ports. Therefore, effects may be substantially different to preempt use of a port for a writeback result versus a restoration result.

In general terms, to accommodate these different effects, arbitration includes comparing writeback and restoration results. Such a result includes identification of the instruction associated with the result, and the register targeted by the result. In a further aspect, in response to the interruption, results are selected for restoration to the registers. Competing port accesses are arbitrated, wherein access to a port is enabled for any writeback result that targets a register not targeted by any of the selected restoration results, but only for certain writeback results which target a register targeted by a restoration result. In particular, access to a port is enabled for a writeback result which targets a register targeted by a restoration result only if the writeback result is for the same instruction as the restoration result (in which case the restoration result is supposed to be the "backup copy" of the writeback result); otherwise, access is enabled for the restoration result (in which case the restoration result is not the backup copy of the writeback result).

In response to having no writeback result pending for one of the ports, access to the port is enabled for one of the restoration results.

It is an advantage of the present invention that results are restored efficiently to the registers. In particular, the invention enables selecting between a writeback result and a restoration result when the results are to the same register, so that only a single one of the results is written to the register and therefore only a single cycle is required. This avoids selecting one of the results to write to the register during a first cycle and then writing the other result to the register during a subsequent cycle.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

BRIEF DESCRIPTION OF THE DRAWINGS

FIG. 4 illustrates organization of the history buffer ("HB") of the preferred embodiment.

FIGS. 5A through 5D illustrate creation of HB entries for representative dispatched instructions.

FIG. 8 illustrates logic for determining a first appearance relation.

FIGS. 9A through 9E illustrate further aspects of the HB, including information passed among elements of the processor in connection with generating, completing, and recovering entries.

FIG. 13 is an arbitration logic table.

DESCRIPTION OF THE PREFERRED EMBODIMENT

To clearly point out novel features of the present invention, the following discussion omits or only briefly describes conventional features of information processing systems which are apparent to those skilled in the art. It is assumed that those skilled in the art are familiar with superscalar processors. And in particular with such processors which operate in an in-order dispatch, out-of-order execution, in-order completion fashion.

Figure 1:
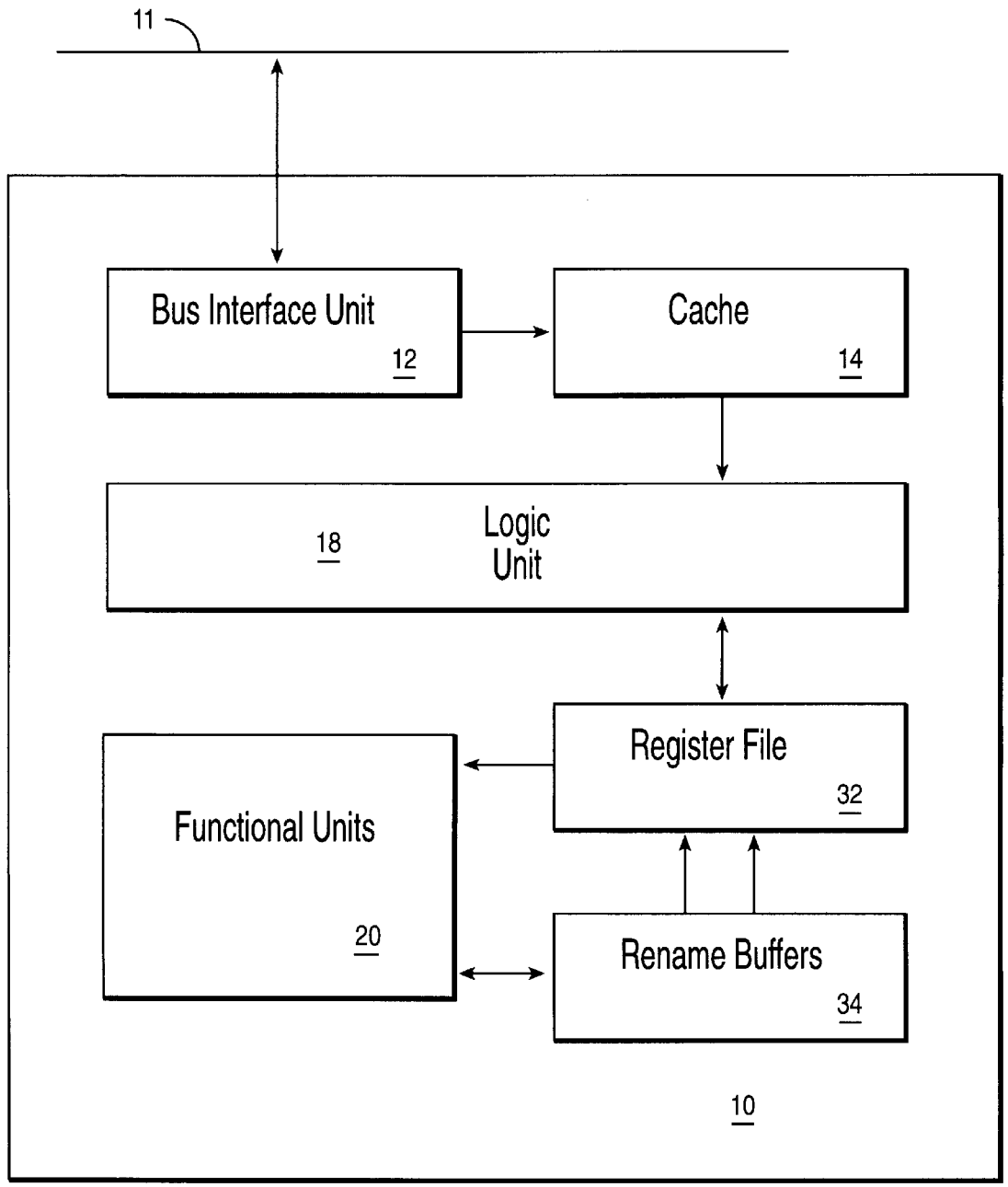
FIG. 1 is a block diagram of a processor which does not share a register file port between a writeback bus and a history restoration bus.
Figure 2:
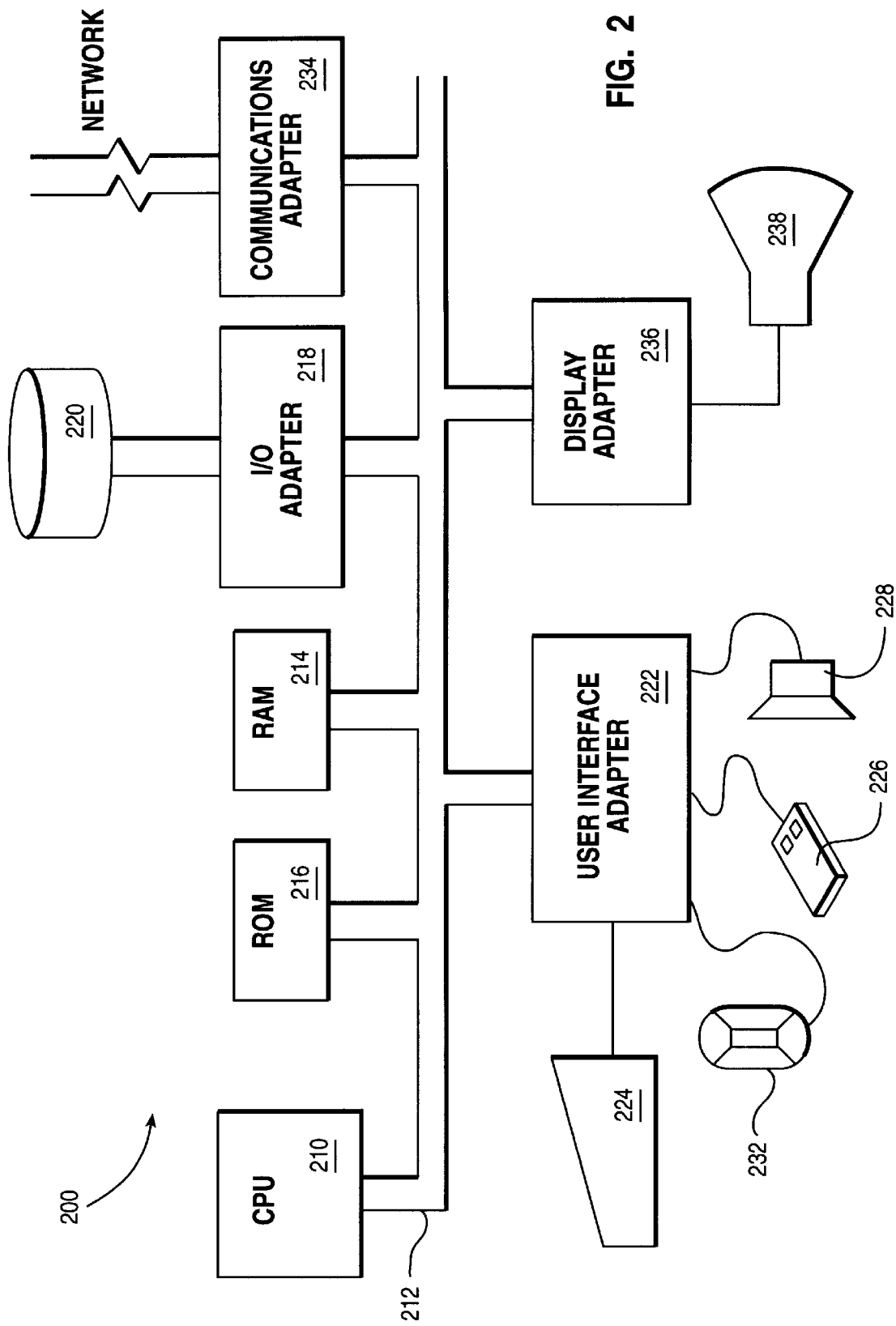
FIG. 2 is a block diagram of a data processing system for a preferred embodiment of the present invention.

Referring to FIG. 2, an example is shown of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor User's Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

The CPU (or "processor") 210 includes various registers, buffers, memories, and other units formed by integrated circuitry, and operates according to reduced instruction set computing ("RISC") techniques. The CPU 210 processes according to processor cycles, synchronized, in some aspects, to an internal clock (not shown).

In the following, emphasis is placed on interruptions arising from speculative execution of instructions. However, as mentioned previously, an interruption may also be caused by an unusual condition arising in connection with instruction execution, error, or signal external to the processor 210. For example, such an interruption may be caused by 1) attempting to execute an illegal or privileged instruction, 2) executing an instruction having an invalid form, or an instruction which is optional within the system architecture but not implemented in the particular system, or a "System Call" or "Trap" instruction, 3) executing a floating-point instruction when such instructions are not available or require system software assistance, 4) executing a floating-point instruction which causes a floating-point exception, such as due to an invalid operation, zero divide, overflow, underflow, etc., 5) attempting to access an unavailable storage location, including RAM 214 or disk 220, 6) attempting to access storage, including RAM 214 or disk 220, with an invalid effective address alignment, or 7) a System Reset or Machine Check signal from a device (not shown) directly connected to the processor 210 or another device in the system 200 connected to the processor 210 via the bus 212. These conditions are discussed further in the above references, "The PowerPC Architecture: A Specification for a New Family of RISC Processors", and "PowerPC 604 RISC Microprocessor User's Manual".

Figure 3:
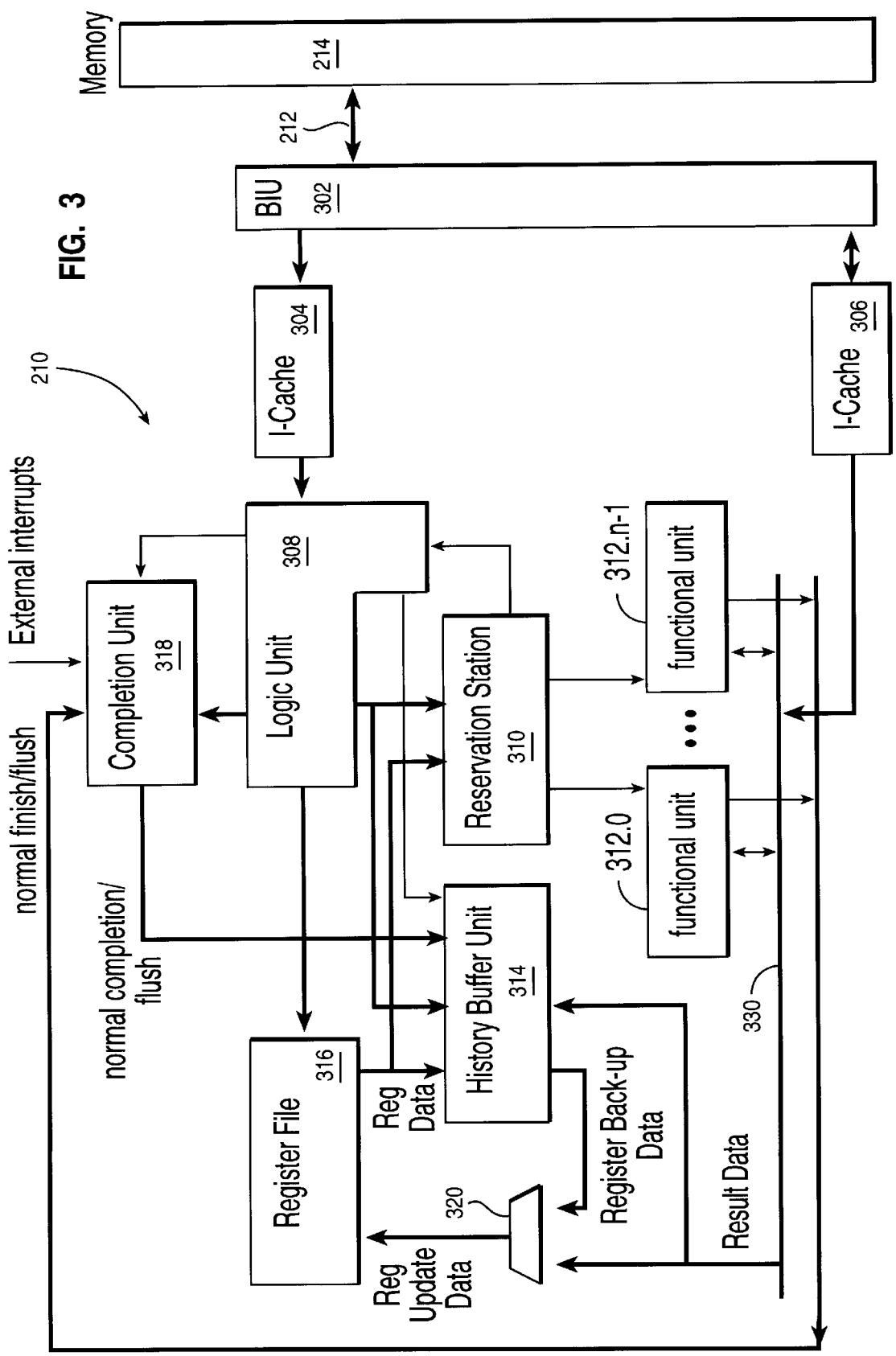
FIG. 3 is a block diagram of a CPU for the preferred embodiment.

Referring to FIG. 3, a block diagram is shown for the preferred embodiment of the invention. (Note that herein a numbered element is numbered according to the figure in which the element is introduced, and is referred to by that number throughout succeeding figures.) Processor 210 has a bus interface unit 302 coupled to the bus 212 for controlling transfers of data and instructions between memory, such as random access memory 214, and caches 304 and 306.

Instructions are processed in processor 210 in a sequence of logical, pipelined stages, as has been previously described; however, it should be understood that the functions of these stages, as implemented in the preferred embodiment, may be merged together, so that this particular division of stages should not be taken as a limitation, unless a such limitation is indicated herein. Indeed, some of the previously described stages are indicated as a single logic unit 308 in FIG. 3 for the sake of simplicity of understanding and because each distinction between stages is not necessarily central to the present invention.

Logic unit 308 in FIG. 3 includes fetch, branch processing, instruction buffer, decode and dispatch units. The unit 308 fetches instructions from instruction cache 304 into the instruction buffer, either based on a normal sequence of the instructions or, in the case of a sequence having a conditional branch instruction, a predicted sequence, the predicted sequence being in accordance with addresses selected by the branch processing unit. The logic unit 308 also decodes the instructions and dispatches them in their original programmed sequence. In dispatching an instruction, the dispatch unit assigns the instruction a target identifier ("TID"), a value unique to the instruction and in a sequence with respect to previously-assigned TID'S, so that an instruction can be uniquely identified by its TID, and the sequence in which instructions are dispatched can be inferred from the TID's of the instructions. The TID may remain associated with the assigned instruction until the instruction is completed. Registers 316 include a TID field, a data field and a W bit.

The logic unit 308 dispatches instructions to an appropriate functional unit 312.0, 312.1, . . . 312.n-1 via reservation station 310, and, if an instruction targets a register, the W bit of the register is reset, indicating that write back of data is pending for the instruction, and the TID assigned to the instruction is stored in the TID field of the register, identifying the instruction for which the data is pending.

During the writeback stage of processing, for an instruction which has been executed, a functional unit asserts on one of the result buses 330 (also referred to as "write back buses") a register pointer, identifying the target register writeback data for the instruction, the TID for the instruction, and the resultant data. If the TID on the write back bus matches that in the TID field of the target register, then the result is written back to the register. Also, the result may be snooped on the result bus 330 by the history buffer unit 314, as will be further described in connection with FIG. 4. A result that is stored in the history buffer unit 314 may be restored to a register 316 via the register back up bus 332 (also referred to as the "history restoration bus"), as will be further described in connection with numerous of the following figures.

The functional units 312 signal the completion unit 318 upon execution of instructions and the completion unit 318 retires the instructions, which includes notifying history buffer logic 314. In addition to notifying the HB logic unit 314 about retired instructions, the completion unit 318 or logic unit 308 also notifies the HB unit 314 about exception conditions and mispredicted branches for which instructions should be discarded prior to completion and for which the HB unit 314 should recover a state of the processor 10 as will be further described below.

Referring to FIG. 4, further aspects are illustrated for the preferred embodiment of a CPU 210 using a history buffer. In particular, the organization of a history buffer 400 of the preferred embodiment is illustrated.

The preferred history buffer 400 has storage locations for holding history buffer entries ("HBE's"), designated as entries HBE0 through HBEN-1 (not shown in FIG. 4). (According to the terminology used herein, when an instruction performs an operation affecting the contents of a register, the operation is said to "target" that register, the instruction may be referred to as a "targeting instruction", and the register is referred to as a "target register" or a "targeted register". For example, the instruction "ld r3, . . ." targets register r3, and r3 is the target register for the instruction "ld r3, . . .". As an instruction is dispatched, a history buffer entry is created for each register within the register file 316 (FIG. 3) targeted by the instruction. An instruction for which an entry is created is referred to as the "entry instruction" for that particular entry. A "current entry instruction" means a dispatched instruction for which an entry instruction is of current interest in the context of the discussion or is the most recently created entry instruction.

In this embodiment, each HB entry has (1) a data field 402 of length equal to the register length in the processor, (2) a validity bit 404 to indicate whether the storage location holds a valid entry, (3) a target ID ("TID") field 406 that uniquely identifies an entry instruction, (4) a group ID ("GID") field 408 that uniquely identifies the most recently dispatched interruptible instruction preceding or including the entry instruction, (5) a target register ("TR") field 410 that identifies the register which is the target of an entry instruction, (6) an L bit 412 which, if set, identifies the entry as the first entry (i.e., leading entry) created after an interruptible point, and (7) a W bit 414 which identifies the validity of either the data field (w=1) or the TID field (w=0).

Each entry also has an FB field 416 with a bit (the "first bit", or simply, "F-bit"), for each entry in the HB 314, so that for N entries in the HB 314, an entry will have an FB field with N F-bits. An F-bit identifies whether a certain dependence relationship exists (defined herein and referred to as "the first appearance relation") between the entry and certain leading entries in the HB. This first appearance relation is defined to exist between a current entry and a jth HB entry, preceding and including the current entry with respect to the programmed sequence of instructions, only if the jth HB entry is a leading entry, and among the jth entry and all HB entries thereafter, up to and including the current entry, the current entry targets a register that has not been targeted by any such other entry. If this relation exists for a current entry the jth F-bit of the current entry is set. If it does not exist, the jth F-bit of an entry is reset.

In one application of the first appearance relation, if an entry is a leading entry and it is the kth HB entry, then, the kth F-bit for this entry is set, because the entry's target register appears the first time relative to itself, a leading entry.

Thus, for any particular leading entry, a certain F-bit among the FB field of the HB entries may be used to identify each subsequent HB entry whose entry instruction modifies a register for the first time since the interrupt point that occasioned the leading entry. That is, for a leading entry which is the jth HB entry, the bits from the jth column of the FB fields of the entry and all subsequent HB entries collectively identify all those HB entries that modify a target register which has not been modified by any other entry since the interrupt point that produced the jth entry.

This particular organization of the history buffer 314 is useful, as will be further illustrated, because data that is necessary for recovering a particular processor 210 state are stored as history buffer entries which are identified, in part, by a particular F-bit.

Note that the L bit for a history buffer entry HBEi is logically equivalent to the Fi bit of that particular entry. Therefore, in a variation of the embodiment described herein, in and HB entry, HBEi, the Fi bit can be substituted for the L bit.

Figure 5D:
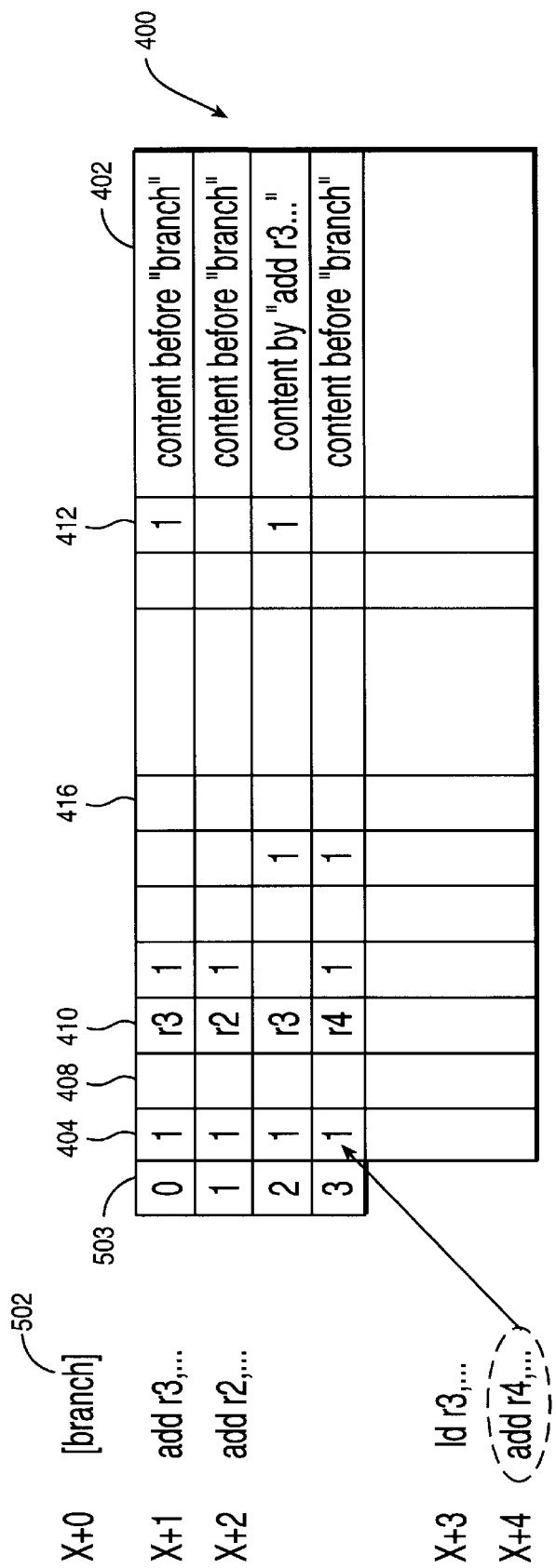

An overview of HB entry creation is illustrated in FIGS. 5A through 5D, which show an example sequence of instructions 502, at lines X+0 through X+4, and relevant portions of the history buffer 314 of the present embodiment. The buffer 314 entries 502 are referred to by entry numbers 503, such as HBE0 shown in FIG. 5A. In the example instruction sequence from lines X+0 through X+4, architected registers r2, r3 and r4 are targeted. Register r3 is targeted by instruction "add r3, . . ." at line X+1, which results in entry HBE0 (FIG. 5A). Register r3 is also targeted by instruction "ld r3. . . ." at line X+3, which results in entry HBE2 (FIG. 5C). Register r2 is targeted by instruction "add r2, . . ." at line X+2, which results in HBE1 (FIG. 5B). Register r4 is targeted by instruction "add r4 . . ." at line X+4, which results in HBE3 (FIG. 5D).

As shown in FIG. 5A, when an entry is created at HBE0 for the instruction "add r3 . . ." at line X+1, it is a leading entry, because it is the first entry created after the branch instruction at line X+0, so the entry has its L bit 412 set. In the history buffer 314, the first F-bit ("F0" ) in the FB field 416 at HBE0 is set, since this leading entry has a first appearance relation to itself.

As shown in FIG. 5B, when HBE1 is created for "add r2", it is not a leading entry after the branch instruction and there is no other leading entry except HBE0 in HB 314. Because entry HBE1 targets register r2, and r2 was not targeted by the preceding leading entry HB0, and has not been targeted by any entry since HB0, HBE1 has a first appearance relation to leading entry HB0 so that F0 in the FB field 416 at HBE1 is set.

As shown in FIG. 5C, the L bit 412 for HBE2 is set because HBE2 is the leading entry associated with the load instruction after the interrupt point (i.e., the branch instruction at line X+0). The F2 bit in the FB field is set because the entry is a leading entry, and has a first appearance relation with itself. Even though HBE0 is an existing leading entry, F0 of the FB field 416 of entry HBE2 is not set because an entry for r3 has been created since HBE0 was created and HBE2 therefore does not have a first appearance relation with entry HBE0.

As shown in FIG. 5D, when history buffer 314 entry HBE3 is created for "add r4 . . . ", F0 and F2 in the FB field 416 at HBE3 are set, indicating the first appearance relation of HBE3 to HBE0 and HBE2, which results from the circumstance that HBE0 and HBE2 are leading entries and HBE3 is the first entry created for r4 since the creation of these leading entries.

Note that HBE0 and HBE2, as shown in FIG. 5D, are the leading entries associated with the two interruptible points, i.e. instructions at lines X+0 and X+3. The "1" value in the "L" field for entry HBE0 marks the entry for recovery from an interrupt occurring at the "branch" instruction, line X. The L field is set for entry HBE2 for recovery from an interrupt occurring at the "ld r3, . . . " instruction, line X+3. Note also, that the collection of F-bits, F0, identify the entries used for one recovery and the collection of F-bits, F2, identify the entries used in the other recovery.

The F-bits of the FB field 416 for N entries of the history buffer 314 make up an N×N "F matrix". This F matrix combined with the associated N leading L bits of the buffer 314 provide a data structure which can be updated in parallel, i.e. multiple entries can be created concurrently, so that a dependence relationship of new entries on existing entries can be created in parallel. Also, a single lookup can yield all entries dependent on a particular entry (e.g., entries identified by F-bits Fi depending on entry i), Furthermore, multiple lookups can be processed in parallel for different entries.

Figure 6:
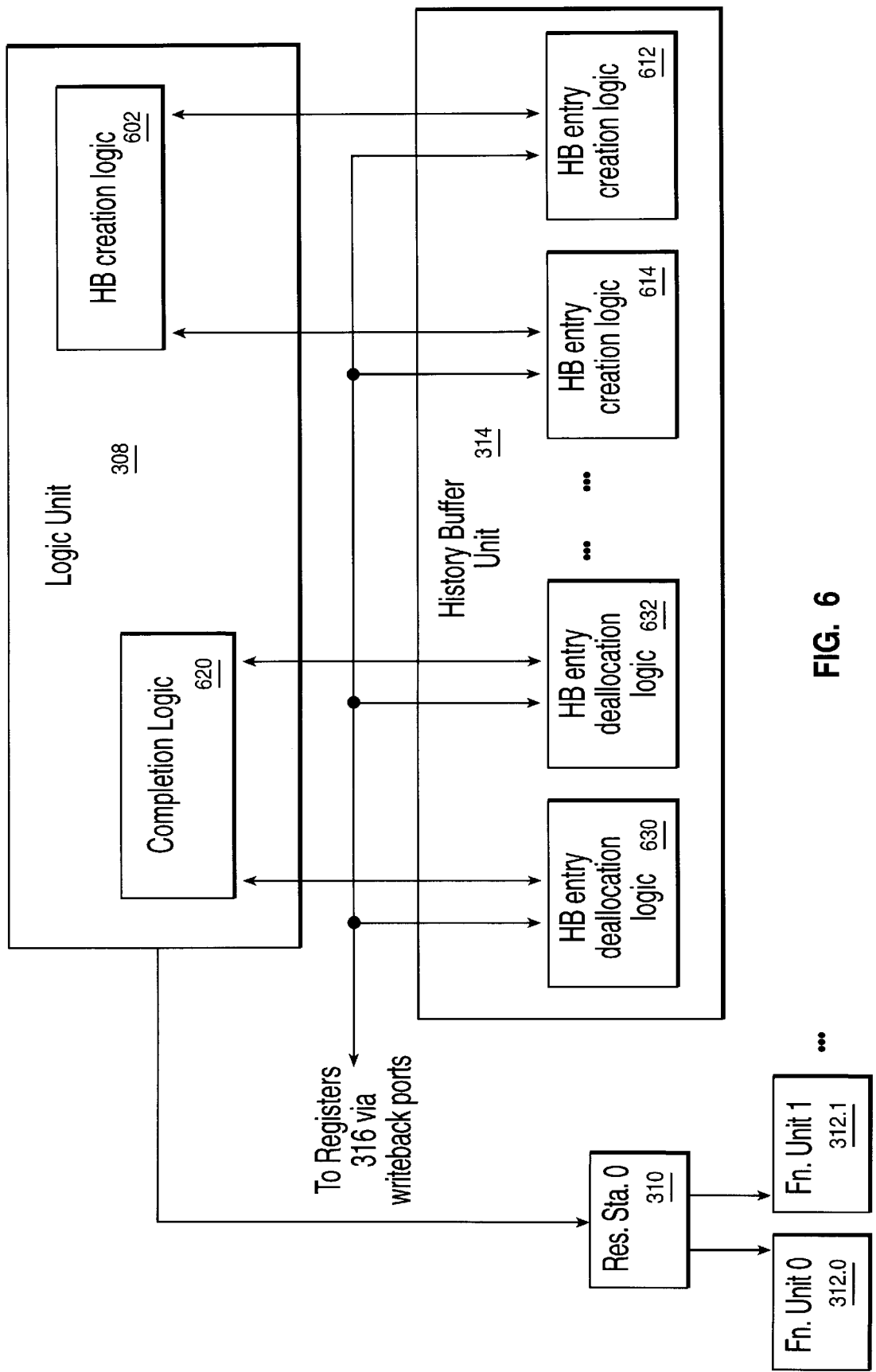
FIG. 6 illustrates generation, completion and recovery of HB entries in the concurrent fashion which is enabled by the preferred embodiment.

The concurrent creation of history buffer 314 entries is further illustrated in FIG. 6, which shows a block diagram including the history buffer unit 314 and HB creation logic units 612, 614, etc. in the history buffer unit 314, as well as a HB creation logic unit 602 and a completion unit 620 in the logic unit 308.

When an instruction, such as an instruction at line X+0, is dispatched to a reservation station 310, the logic unit 308 sends information for the instruction to HBE creation logic unit 612 in the history buffer unit 314. Concurrently, other instructions, such as instruction at lines X+1, etc., may be dispatched and information may also be sent by the unit 308 to HBE creation logic 614, etc. in the HB unit 314.

The information for a dispatched instruction, such as an instruction at line X+0 (which may be referred to as instructions) includes the following:

1. Valid bit 404: A dispatched instruction has an associated valid bit. Upon creation of an entry in the HB 400, a valid bit 404 for the entry is set. The valid bit 404 in the HB 400 remains set until the entry is retired or flushed, as will be further described below.

2. Group Identifier 408: a group identifier ("GID"), identifying which group of instructions the HBE instruction is among, where instructions are grouped such that a group of instructions begins with one interruptible instruction and continues up to the next interruptible instruction.

3. Target Register 410: identifying one or more target registers ("TR's"), and including a Target Valid bit (not separately shown) indicating whether the instruction actually targets a register. (Residual data may exist identifying a target register, when there actually is no target register. In such a case, the Target Valid bit signals this condition.)

4. Target Register Data 402: the current data field of the target register data ("TRD") before executing the entry instruction.

5. Target identifier 406: A target identifier ("TID") is a value assigned by the dispatch unit to a dispatched instruction, the value being unique to the instruction and being in ascending numerical order with respect to previously assigned values, so that an instruction may be uniquely identified by its TID and the sequence in which instructions are dispatched may be inferred from the TID's of the instructions. An entry in the HB 400 is needed for a TID because when a first instruction is dispatched, the contents of its target register or registers may not yet be determined because some other instruction that targets the register may not yet have executed. In such a case, the data field of the HB 400 entry for the first instruction will not contain correct data for the target register at the time the entry is created, and therefore the TID field provides an indication of the register content. That is, the TID field is used for indirectly addressing the correct data. See the description of the W bit field immediately following for further explanation.

6. W bit 414: indicating whether data has been deposited into the target register of the dispatched instruction by the most recent preceding dispatched instruction targeting the same register. If the W bit is set, this indicates that the TRD field 402 for the dispatched instruction has valid data for the target register of the current dispatched instruction. If the W bit is cleared, this indicates that data for the target register of the current dispatched instruction is not available at the time of creating the HB entry, but will be provided by execution of a previously dispatched instruction uniquely identified by the TID field 406 in the HB 400 for the current instruction.

The history buffer logic unit 314 snoops certain information on the result bus 330 in order to update HB 400 entries. The result of executing an instruction is asserted on a result bus 330 by an functional unit 312. The result asserted includes the TID of the instruction. If the HB logic unit 314, snooping a result bus 330, detects a result for an entry having a matching TID and having a W bit cleared, the logic unit 314 stores the result in the TRD field 402 for the entry and sets the entry's W bit 414.

Also, processing of a dispatched instruction may be cancelled anytime before the instruction is completed (such a case being referred to as a "flush"), such as due to an interrupt, so that the dispatch becomes invalid. Furthermore, upon execution of an instruction, the instruction will be retired. For such a flushed or retired instruction, the dispatch unit 308 will notify the history buffer unit 314 that the instruction is no longer valid. If a history buffer 400 entry has already been created for the instruction, the history buffer unit 314 will clear the valid bit 404 for the entry.

Figure 7:
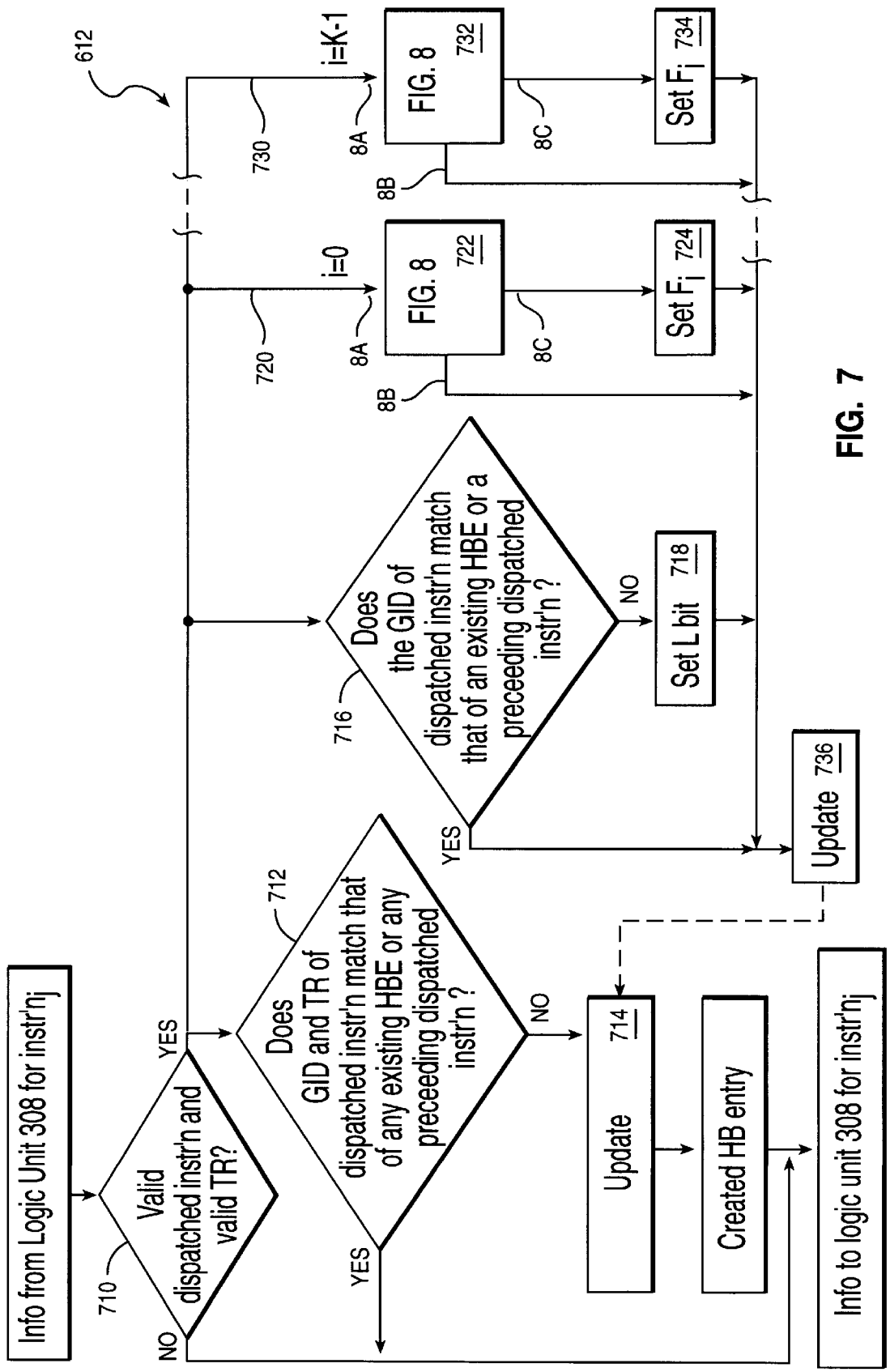
FIG. 7 illustrates logic for creating an HB entry.

Referring now to FIG. 7, typical HB entry creation logic 612 is illustrated. Although the logic 612 is depicted, for convenience of illustration, as having certain sequential steps, such as block 716 following block 710, it will be apparent to a person of ordinary skill in the art that some or all of the logical analysis may be performed concurrently. To emphasize this capability of the logic 612 to perform concurrent analysis of information, the analysis is shown to flow in parallel to certain blocks, such as from block 710 to blocks 712, 716, 720 and 730; however, the analysis should not be interpreted as limited to the particular flow illustrated.

For the dispatched instruction$_j$, the HB unit 314 logic 612 receives the information sent by the logic unit 308, and determines at 710 whether the instruction$_j$ and its target register are valid. If not, the logic 612 branches at 710 to send information to the dispatch unit at 750, as will be further described herein, and does not create a history buffer 400 entry. If the instruction$_j$ and target register are valid, the logic 612 determines at 712 whether the GID 408 and TR 410 of the dispatched instruction$_j$ matches that of any existing history buffer 400 entry, or whether the dispatched instruction has the same target register as any of the instructions dispatched in parallel with and in the same group as the dispatched instruction (i.e., having the same GID), for which there are not yet entries in the HB, but preceding the dispatched instruction in program order (i.e., as may be determined by TID). If no, then the logic 612 updates the L and F bits for a new history buffer 400 entry from concurrently processed logic at 736, as will be further described below, creates a history buffer 400 entry at 740, and sends information at 750 to the logic unit 308. If yes, then the logic 612 branches at 710 to send information at 750 to the unit 308, as will be further described herein, and does not create a history buffer 400 entry.

Thus, for example, no HB entry will be created for a current dispatched instruction having no target register. Likewise, no HB entry will be created for a current dispatched instruction in the same group (therefore having the same GID) as a previously dispatched instruction, if the previously dispatched instruction already has an HB entry and targets the same register as the current dispatched instruction. Also, note that at the time an instruction is dispatched, even if there is no entry in the HB having the same target register and the same GID as the newly dispatched instruction, it still can occur that no HB entry will be created for the newly dispatched instruction, if, among the other instructions dispatched in the same group of instructions as the newly dispatched instruction, but preceding it in sequence, one of these other instructions targets the same register as the newly dispatched instruction.

When the new entry is created, the previously described information for the dispatched instruction is written, according to the defined fields, into a location in the history buffer 400 designated as "unoccupied" by means of the valid bit 404. That is, the location is designated as "occupied" or "unoccupied" depending on whether the valid bit 404 is set or cleared. When the history buffer logic 612 creates the history buffer 400 entry at 740, the logic 612 sets the valid bit 404 to designate the entry as "occupied". As previously described, the valid bit 404 is cleared when the entry instruction is cancelled or retired.

The logic 612 also determines at 716 whether to set the L bit 412 for the history buffer 400 entry, indicating that the entry is the first after a new interrupt point. Specifically, logic 612 determines at 716 whether either of the following is true: (1) any existing entries in the HB have the same GID as the instruction being considered, or (2) among the instructions being dispatched currently, there exists an instruction that targets a register and has the same GID as the instruction being considered. If yes, the logic 612 at 716 branches to block 736 and updates the state of the proposed L bit to a "cleared" state. If no, the logic 612 at 716 continues to block 718 for setting the L bit, and continues to block 736, updating the state of the proposed L bit to the "set" state.

The logic 612 also determines whether to set F bits of the FB field 416 for the history buffer 400 entry, in case such an entry will be created for instruction. According to the embodiment, the history buffer unit 314 maintains, for each valid entry in the history buffer 400, an FB field 416 having an F bit corresponding to each valid entry. Therefore, with k entries in the history buffer 400, when instruction$_j$ is processed by the logic 612 for creating a possible entry in history buffer 400, the logic 612 determines the required state of F bits $F_0$ through $F_{k-1}$ to indicate the first appearance relation of the next potential entry to the existing k entries. Also, the logic 612 determines the required state of F bit $F_k$, to indicate the first appearance relation of the next potential current entry to itself.

To clarify the above, k existing entries with consecutive HBE locations from 0 through k-1 have been described. In reality, the k entries are likely to be non-consecutive, wherein valid entries are separated by unoccupied HB entries. For k such non-consecutive entries, logic 612 determines the required state of Fi bits, where i corresponds to the index of a unique existing HBE.

According to FIG. 7, branch 720 starts the logic for the first F bit, F0, of a new entry. The logic determines at 722 whether the F bit, $F_0$, should be set or cleared. If the F bit is to be cleared, the logic at 722 branches to block 736 and updates the proposed F bit to the "cleared" state. If the F bit is to be set, the logic at 722 branches to block 724 for setting the F bit, and continues to block 736, updating the state of the proposed F bit to a "set" state.

Branch 730 starts the logic for the last F bit, $F_{k-1}$ of the new entry. Then the logic determines at 732 whether the last F bit should be set or cleared, and so on. Determination of required status for intermediate F bits is implied but not expressly shown in FIG. 7.

In general terms, the F bit, Fi, of a new entry is set if either of the following conditions, condition A or B, is satisfied. Condition A concerns whether the new entry has a first appearance relation to an existing, leading HB entry. Condition B concerns whether the instruction being evaluated has a first appearance relation to instructions for which there are not yet HB entries, where the instructions are dispatched in the same group with the instruction being evaluated.

Note also, that HB locations are reused. So, for example, when a new HB entry, HBEi, is created there may some residual effects of an old HBEi that are reflected in other entries. Therefore, in connection with creating HBEi, the Fi bit must be cleared for the existing HB entries (which preceded the new HBEi). This prevents an erroneous indication of a first appearance relation between the new HBEi and an existing HB entry. These Fi bits may be cleared any time from when the old HBEi is retired to the time when the new HBEi is created.

Referring now to FIG. 8, the details of the logic 612 at 722 (FIG. 7) are shown for evaluating whether an F bit should be set. It should be understood that the following description also applies to other blocks for evaluating whether an F bit should be set, such as block 732 shown in FIG. 7 and others implied in FIG. 7.

Condition A, describe above in general terms, corresponds to logic blocks 810 through 816. Referring now to these logic blocks, the logic 612 determines at 810 for the F bit being evaluated, i.e., $F_i$, whether the HB 400 entry corresponding to the F bit is valid (i.e., the valid bit for HBEi is set). If not valid, then the logic at 810 branches to block 736 (FIG. 7) and the F bit will not be set in connection with condition A. If yes, the logic at 810 continues to block 812. The logic 612 determines at 812 if the L bit of existing HBEi is set. If not, then the logic at 812 branches to block 736 (FIG. 7) and the F bit will not be set in connection with condition A. If the L bit is set, the logic at 812 continues to block 814. The logic 612 determines at 814 whether, among the valid, existing HBE's with F bit Fi set, any such HBE has the same target register as the dispatched instruction being evaluated. If yes, then the logic at 814 branches to block 736 (FIG. 7) and the F bit will not be set in connection with condition A. If no, the logic at 814 continues to block 816. The logic 612 determines at 816 whether, among the instructions dispatched in the same group of instructions with the instruction being evaluated, but preceding it in program order, any of such instructions have the same target register as the instruction being evaluated. If yes, then the logic at 816 branches to block 736 (FIG. 7) and the F bit will not be set in connection with condition A. If no, the logic 612 at 816 continues to block 724 (FIG. 7), for setting the F bit, then to block 736 where the status of the proposed F bit is updated to a status of "set".

Condition B, described above in general terms, corresponds to logic blocks 820 through 824 in FIG. 8. Referring now to these logic blocks, the logic 612 determines at 820 if HBEi will be occupied by an instruction dispatched in the same group of instructions with the instruction being evaluated, but preceding it in program order. If no, then the logic at 820 branches to block 736 (FIG. 7) and the F bit will not be set in connection with condition B. If yes, the logic 612 at 820 continues to block 822. The logic 612 determines at 822 if HBEi will be a leading entry (i.e., whether HBEi will have its L bit 412 (FIG. 4) set). If no, then the logic at 822 branches to block 736 (FIG. 7) and the F bit will not be set in connection with condition B. If yes, the logic 612 at 822 continues to block 824. The logic 612 determines at 824 whether, among the contemplated HBE's from HBEi through the HBE immediately preceding the potential new entry, any such HBE's have the same target register as that of the instruction being evaluated. If yes, then the logic at 822 branches to block 736 (FIG. 7) and the F bit will not be set in connection with condition B. If no, the logic 612 at 824 continues to block 724 (FIG. 7) for setting the F bit, and to block 736, updating the status of the proposed F bit to a "set" state.

When the HB logic 612 (FIG. 6) creates an entry at 740 (FIG. 7), it returns the address of the entry (i.e., the HB location of the entry) to logic (not shown) in the logic unit 308 (FIG. 6) for an Instruction Interrupt Table ("IIT") which associates GID's and HB entry addresses with interruptible instructions. Aspects of the IIT are shown in FIG's 9A, 9B, etc. Although shown here in unit 308, the IIT could be located in another element, such as the history buffer logic 314. If the HB logic 612 does not create a new HB entry for an instruction, the HB address will be returned for an entry corresponding to the next instruction (in programmed sequence) for which an entry is created.

Depending on implementation, the HB address corresponding to such next instruction can be determined 1) at the time when the instruction that does not require an HB entry is processed or 2) at the time when such next instruction is processed. The first approach requires maintaining a HB address for the next instruction which is yet to be dispatched. The second approach requires an extra bit in the instruction interrupt table to indicate whether an IIT entry has a valid HB address, indicating that the next instruction requiring an HB entry has been processed, or an invalid HB address, indicating that the next instruction requiring an HB entry has not been processed. The following assumes the first approach.

The creation of history buffer entries is further illustrated in the following FIGS. 9A through 9D. Referring now to FIG. 9A, this example depicts a GID of 1 in the IIT 902, field 912, indicating that the logic unit 308 dispatched the "branch" type of instruction at line X+0 as part of a group of instructions having GID=1. The instruction at X+0 is assigned a new GID because it is interruptible. The instruction at X+0 is the first (in program sequence) among a number of instructions having the GID value of "1", because it is followed by the non-interruptible instructions at lines X+1 and X+2, and non-interruptible instructions are not assigned a new GID. The history buffer unit 314 does not create an entry for the branch type of instruction at line X+0 because the instruction does not target a register. Therefore, when the history buffer unit 314 creates an entry in the HB 400 at a HB address 503 of "0" for the instruction "add r3, . . . " at X+1 immediately following the branch type instruction at line X+0, the unit 314 returns the "HBE0" HB address 503 to the logic unit 308 IIT 902 for the instruction at line X+0, and the unit 308 stores the HBE address "0" at 910. The L bit 412 for HBE0 is set because HBE0 is the leading entry for the interruptible instruction at X+0. The history buffer unit 314 stores the GID value "1" in the GID field 408 for the instruction at line X+1.

This illustration shows creating HBE0 first, HBE1 second, and so on. However, since history buffer entries are not necessarily deallocated in similar order, a history buffer location that is available for use when an instruction is dispatched will not necessarily be the location in the buffer that immediately follows the location used for the immediately preceding entry. Therefore, the history buffer unit 314 also sets a pattern in a creation order bit vector (not shown) for HBE0, to record the order of creation of the entry relative to other history buffer entries.

Referring to FIG. 9B, the history buffer unit 314 creates an entry in the HB 400 at an HB address 503 of "1" for the instruction "add r2, . . . " at line X+2. The history buffer unit 314 also sets a pattern in the creation order bit vectors (not shown), to indicate that HBE0 immediately precedes HBE1 in creation order.

Referring to FIG. 9C, the example depicts a GID of 2 at IIT 902, field 912, indicating that the unit 308 dispatched the "ld r3 . . . " instruction at line X+3 as part of a group of instructions with this GID=2. The instruction at X+3 is assigned a new GID=2 because it is interruptible. The instruction at X+3 is the first in program sequence among a number of instructions having the GID="2", because it is followed by the non-interruptible instruction at line X+4, which is not assigned a new GID. The history buffer unit 314 creates an entry in the HB 400 at an HB address 503 of "2" for the instruction "ld r3, . . . " at line X+3 and returns the "2" HB address 503 to the logic unit 308, IIT 902. The unit 308 stores the HB address in the IIT 902 at 910 in association with the instruction at line X+3, as does the history buffer unit 314 in the GID field 408 of the history buffer 400. The history buffer unit 314 also sets a pattern in the creation order bit vectors (not shown), to indicate that HBE1 immediately precedes HBE2 in creation order.

Referring to FIG. 9D, the history buffer unit 314 creates an entry in the HB 400 at an HB address 503 of "3" for the instruction "add r4, . . . " at line X+4. The history buffer unit 314 also sets a pattern in the creation order bit vectors (not shown), to indicate that HBE2 immediately precedes HBE3 in creation order.

Deallocation of History Buffer Entries—Completed Interruptible Instructions.

It is unnecessary to sustain resources for backtracking to an earlier processor state for instructions that have completed when all preceding interruptible instructions have been completed (or can be concurrently completed). These resources include the HB 400 entries for all instructions dispatched with the same GID as their associated interruptible instruction which has completed or aborted. Therefore, the HB 400 entries for such instructions may be retired (deallocated).

Figure 10A:
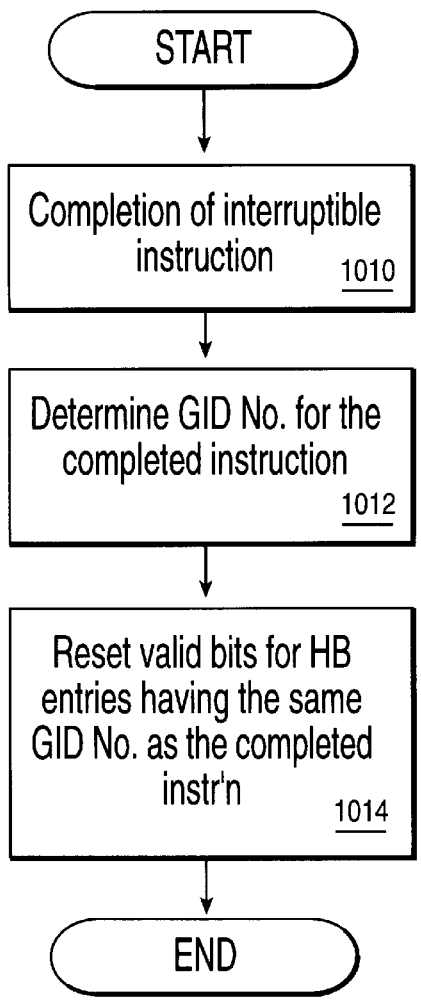
FIG. 10A illustrates logic for completing entries.

With reference now to FIGS. 10A and 6, the following describes retirement of HB entries associated with a completed interruptible instruction that does not cause an interrupt. Completion control logic 620, in the logic unit 308, signals completion to HBE deallocation logic 630 of HB unit 314, as shown at 1010 in FIG. 10. At 1012 the logic 620 determines the GID for the group of instructions associated with the completed interruptible instruction and sends the GID to the HB unit 314. At 1014 the deallocation logic 630 compares the GID to all valid HB 400 entries and resets the valid bits 404 for the valid entries having matching GID's 408. The valid bits 404 being reset indicates that the HB 400 entries are invalid and the HB addresses 503 are available for storing new entries.

Note that entries may be retired concurrently by the HB deallocation logic 630 by resetting a number of bits during a single processor cycle. Moreover, since the HB logic unit 314 includes multiple deallocation logic elements 630, 632, etc., HB 400 entries for numerous interruptible instructions that complete concurrently may all be deallocated concurrently. For example, entries for a number of interruptible instructions in consecutive program order which have executed and have been resolved as correctly predicted may be concurrently deallocated, along with entries for instructions having corresponding GID's. The number which may be thus concurrently deallocated depends on the number of deallocation logic units 630, 632, etc.

Retirement of entries per the logic of FIG. 10A is further illustrated in the example shown in FIG. 9A. Once the instruction at line X+0 is completed and it is resolved that the instruction was correctly predicted, there is no longer a need to retain the HB 400 entries created for instructions dispatched prior to the next dispatched interruptible instruction, i.e., HB 400 entries having the GID 404 corresponding to the line X+0 instruction's GID in the unit 308 at 912, since these are associated with instructions that are not interruptible and are before the next interruptible instruction in program sequence. Thus, if the branch at line X+0 is resolved as correctly predicted, then, upon completion (when all its preceding interruptible instructions have been completed or can be concurrently completed), the completion control logic 620 will send a completion signal for the branch instruction at X+0 to the HBE deallocation logic 630 in the HB logic unit 314, including the GID value of "1". Based on the matching GID's, the HB logic 314 retires HBE0 and HBE1, resetting their valid bits.

Deallocation of History Buffer Entries—Cancellation of Instructions.

Figure 10B:
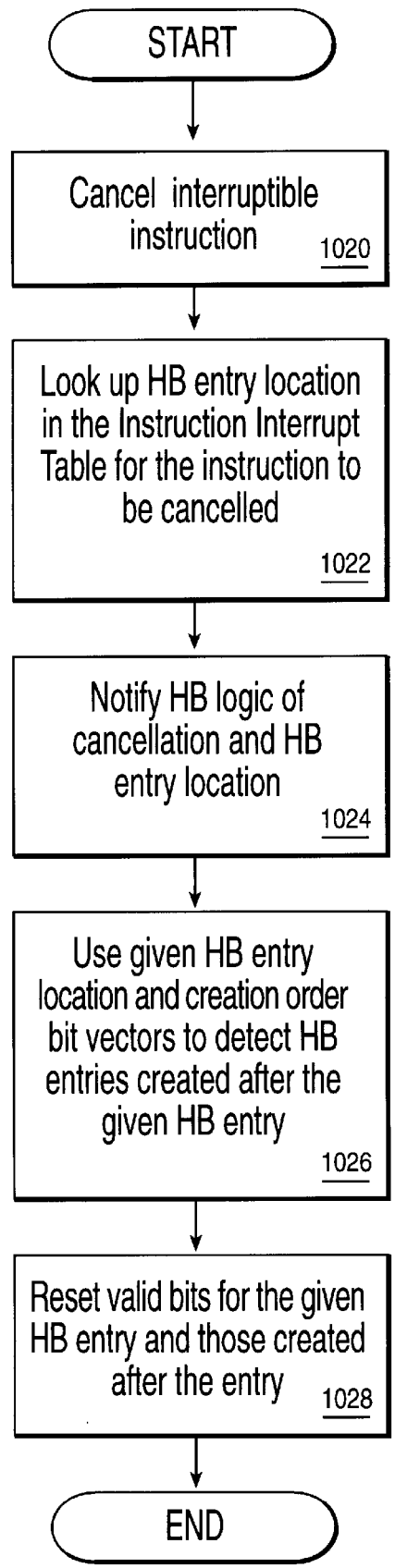
FIG. 10B illustrates logic for cancelling entries.

If an interruptible instruction is cancelled, rather than completing, entries for the instruction and subsequent instructions having the corresponding GID must be deallocated, just as described above; however, additional entries must also be deallocated—namely, entries for instructions which follow the cancelled instruction but do not have the same GID as the cancelled instruction. FIG. 10B illustrates logic for this deallocation in the context of cancellation. At 1020 the cancellation of an instruction is initiated. At 1022 logic unit 308 determines the history buffer entry for the cancelled instruction. The history buffer unit 314 is notified at 1024 of the cancellation of the instruction and of the instruction' identified entry. At 1026 the creation order bit vectors are used by the history buffer deallocation logic 630 to detect the entries created after the entry of the cancelled instruction. At 1030 the valid bits are reset for the entry of the cancelled instruction and for the entries created thereafter.

Deallocation of history buffer entries—interruption of interruptible instructions and recovery of processor state.

History buffer 400 entries associated with an interrupted instruction may also be retired, but they also must be used to recover the state of the processor 210 as the state existed prior to the execution of the instruction. Referring now to the logic shown in FIG. 10C, recovery of the processor 210 state is illustrated when an interrupt occurs. At 1030 the interrupt is initiated. At 1032 the logic unit 308 determines the HB address 503 for the leading entry associated with the interrupted instruction. (This HB address 503 is available to be sent to the HB deallocation logic 630 because the address 503 was sent to the logic unit 308 by the HBE creation logic 612 when the HB 400 entry was created for the associated interruptible instruction.) For example, consider the instruction at line X+0, as shown in FIG. 9A. Since the instruction at line X+1 resulted in generating the history buffer 400 entry, the entry for the instruction at line X+1 is the leading entry associated with the instruction at line X+0 because the entry was the first entry generated for the instruction at line X+1, and the instruction at X+1 followed first, in program sequence, the instruction at line X+0 , and because the instruction at X+0 is an interruptible instruction. Upon generation of the entry, the logic unit 308 stored at 910 an HBE address 503 of "0" for the instruction at X+0. If the executed branch type instruction at line X+0 causes an interrupt, the unit 308 sends a signal indicating the interrupt occurred and sends the HBE address "0" to the HB deallocation logic 630.

Referring again to FIG. 10C, at 1034 the logic unit 308 sends the HB address for the interrupted instruction to the HB unit 314, and notifies the HB unit that the interruption has been initiated for the instruction. At 1036 the HB unit 314 selects a set of F bits corresponding to the decoded address. This includes the HB unit 314 decoding the address of the given HB entry (determined at 1032). For example, in FIG. 9E the HB deallocation logic 630 (FIG. 6) decoder 920 decodes the "0" HB address 503 into a 10-bit vector having a first bit value of "1" identifying the first entry in the history buffer 400 as the leading entry of interest. The decoder 920 sends resulting control signals 922 to a multiplexer 924 to select a set 926 of F bits 416. That is, the first F bit in each HB 400 entry is selected, providing a set 926 of F bits which corresponds to the first HB 400 entry. In more general terms, for an ith HB entry, identified by its HB address 503, the ith F bit among the HB entries is selected by the multiplexer 1006.

At 1038 the HB unit 314 selects a set of HB entries using the selected F bits. Only the minimum set of HB entries is selected. In the prior art history buffer, as previously described, the order of speculative execution is exhaustively reversed and multiple instances of register content are selected, a first instance is restored to a register, and then a next instance is restored in place of the first, and so on. In contrast, according to the present invention only one entry is selected for any register, and this is done only for those registers that need to be restored according to the particular interruption.

Figure 9E:
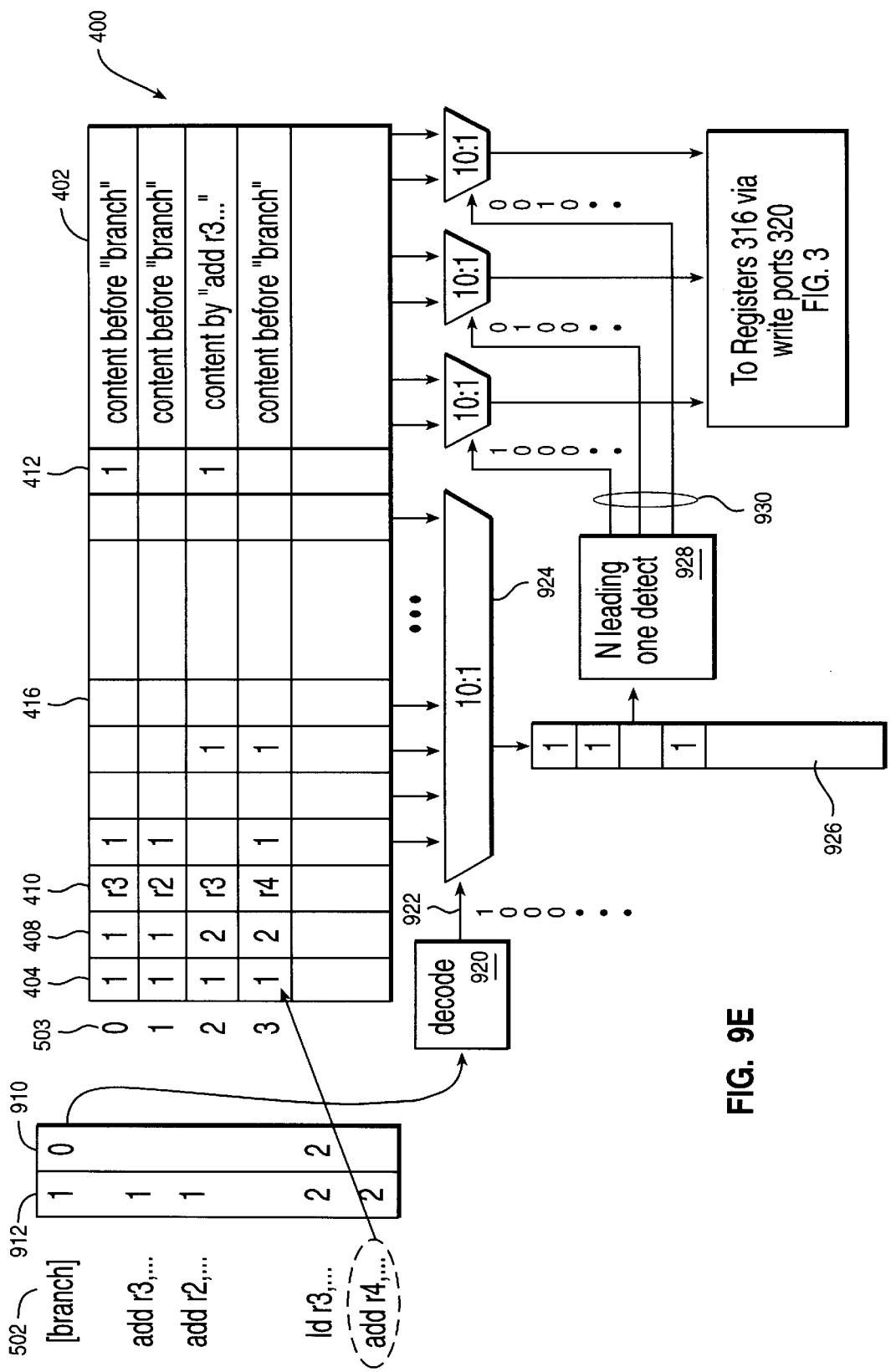

For example, as shown in FIG. 9E, among the selected F bits 416, those having a value of "1" identify history buffer 400 entries which have data needed to restore register file 316. In the example, history buffer 400 entries at HB addresses 503 of "0, 1 and 3" have data needed to restore register file 316. By using the set 926 of F bit 416, the correct entries containing the register contents associated with an interrupt point are selected from among multiple entries having the same target registers.

In this example, selecting the right instance out of many instances of a particular register is illustrated by HBE0 and HBE2, which both have instances of r3. HBE0 is for the interrupt point associated with the "branch" type instruction at X+0, and HBE2 is for the interrupt point associated with "ld r3, . . . " at X+3. The F0 and F2 bits identify different sets of entries for recovery. F0 identifies HBE0 as a member of the set of entries including HBE0, HBE1 and HBE3 that are used to recover the processor state as the state existed prior to executing the branch instruction at X+0. F2 identifies HBE2 as a member of a set of entries used to recover the state prior to the instruction at X+3.

Vectorizing logic 928 isolates the selected set 926 of F bits 416 into individual one-bit vectors, having value 1, in an "N leading 1 detect" format. For the first F bit, F0, in the example, vectors 1000000000, 0100000000, 0001000000, etc. are produced.

Figure 10C:
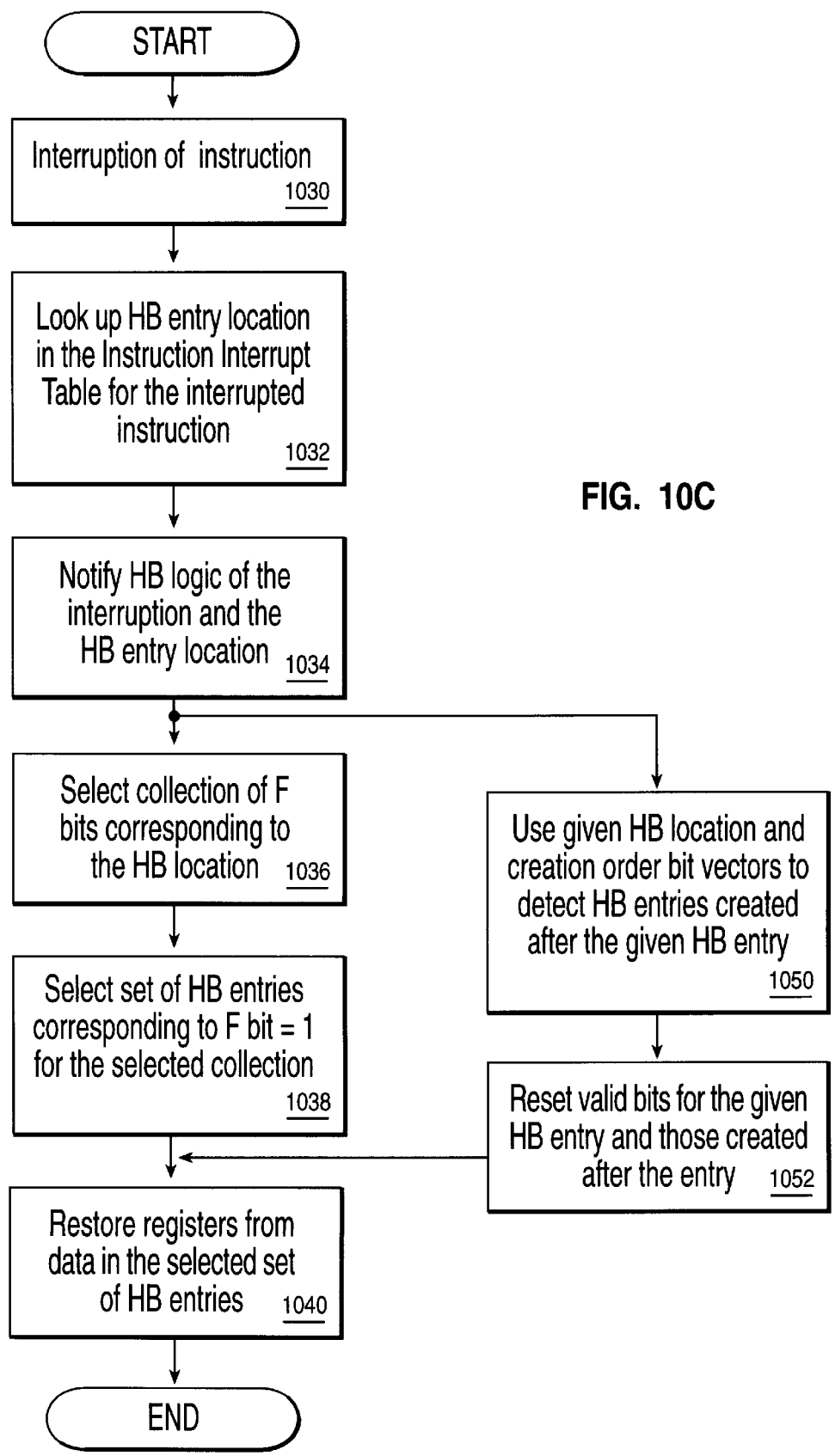
FIG. 10C illustrates logic for recovering entries due to an interruption.

The logic 928 sends the vectors to multiplexers 930 to select history buffer 400 entries needed to restore the processor 210 logic. TR 410, TID 406, W 414 and Data 402 fields from the selected entries are muxed out and sent to the Register File 316 for restoring architected registers, as indicated in FIG. 10C at 1040.

During the cycle when the above described decoding, etc, is performed so that the register file 316 may be restored using identified entries, entries are also deallocated by resetting valid bits 404. That is, referring to FIG. 10C, at 1050 the HB logic unit 314, having been notified of the interruption of the instruction and of its identified entry, uses the creation order bit vectors in the history buffer deallocation logic 630 to detect the entries created after the entry of the cancelled instruction. At 1054 the valid bits are reset for the entry of the cancelled instruction and for the entries created thereafter.

Since all HB 400 entries necessary for backtracking to a processor state prior to the aborted instruction at line X+0 are identified by the set 926 of F bits 416 associated with that instruction, all the entries for an interrupted instruction may be restored and retired concurrently. That is, the required entries may be written to the registers in the register file 316 via the write ports 320 and retired from the history buffer 400 during a single processor cycle by the HB deallocation logic 630. This is in contrast to the multiple cycle sequence of retiring entries in reverse program order that has been practiced in the prior art. Moreover, since the HB logic unit 314 includes multiple deallocation logic elements 630, 632, etc., HB 400 entries for numerous interruptible instructions that complete concurrently may be deallocated in the HB 400 concurrently.

Although numerous HB 400 entries may restore the register file 316 concurrently by the embodiment described, the number is, of course, not without limit. The number of vectors produced by this logic 928, and thus the number of concurrent writes to the register file 316, is limited by the maximum number of write ports 320 into the register file 316. If the selected set of F bits 416 identifies more HB 400 entries than this maximum number, the remaining entries are restored in one or more additional cycles.

Additional control logic takes care of the case when the set of HB entries selected in a particular recovery exceeds the number of available write ports to the architected register file. The history buffer control logic of the recovery process will select the number of entries corresponding to the number of available write ports to be used in the first cycle of recovery. Meanwhile, the Fi bits associated with the recovery entries will be used to generate the remaining set of recovery entries used in the second cycle of recovery. The Fi bits associated with the entries selected for the first cycle will be excluded from the new Fi bits identifying the remaining entries. The Fi bits can thus be updated to reflect the change, or another bit vector (an "R vector") with each bit associated with an HBE can be used solely for containing the updated Fi bits. For the R vector alternative, updated Fi bits will be stored in the R vector for each additional cycle the recovery process requires. The process then iterates until the R vectors contains only zero valued bits.

During restoration, the data field, W bit and TID of an HB entry selected for restoration (a "restoration" entry), is written back to the target register specified by the register pointer, TR, of the HB entry. It is possible that the W bit of the HBE has a logic value zero because the result data has not been returned to the HBE from a functional unit. In such a case, in response to the zero valued W bit being restored to the register, register control logic will snoop the result data using the restored TID.

Figure 11:
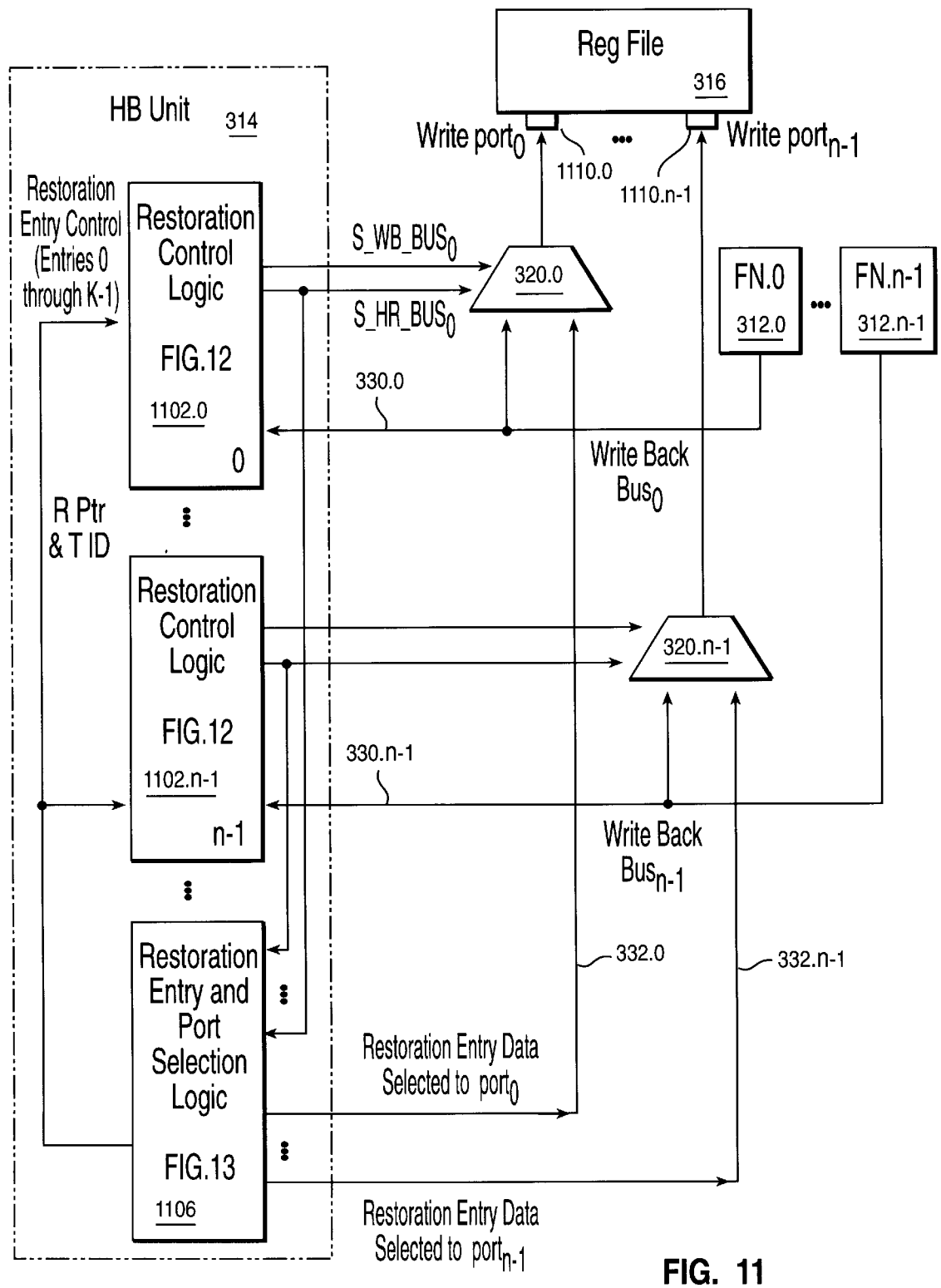
FIG. 11 is a block diagram including restoration control logic and restoration entry and port selection logic units.

Referring now to FIG. 11, details are shown for the result and history restoration buses 330 and 332, and associated logic. Each port 1110 to the register file 316 is connected to a multiplexer 320, which is coupled to a write back bus 330 and a history restoration bus 332.

Figure 12:
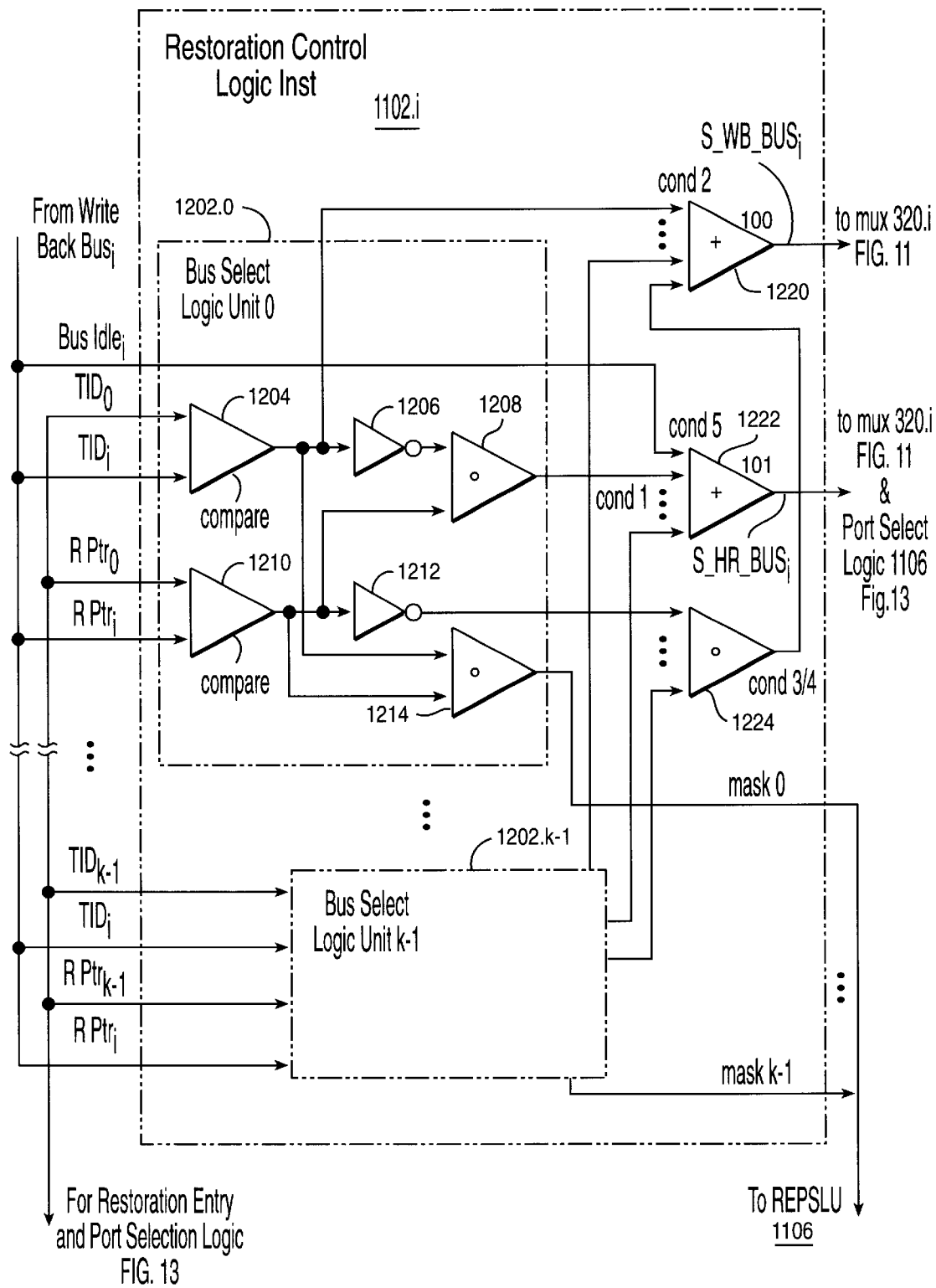
FIG. 12 illustrates logic for a restoration control logic unit.

The write back buses 330 are coupled to the functional units 312 so that a functional unit can write back a result of executing an instruction to the register file 316 through a port 1110 via a write back bus 330. The write back buses 330 are also coupled to the history buffer unit 314. (Not shown in FIG. 11 is the logic for the history buffer unit 314 to snoop write back buses 330. Such snooping was previously described.) As shown in FIG. 11 each write back is coupled to a restoration control logic unit 1102. (Details of a typical logic unit 1102 are shown in FIG. 12.)

The history restoration buses are coupled to restoration entry and port selection logic ("REPSLU") 1106 in history buffer logic unit 314 for restoring history buffer entries to the registers 316 from the history buffer unit 314. The REPSLU 1106 includes logic illustrated in FIG. 9E for selecting which HBE's are needed for restoring registers in response to an interrupt. The HBE's thus selected for restoration are referred to as restoration HBE's. To arbitrate between accesses to a port 1110 by a write back bus 330 and restoration bus 332, restoration control logic unit 1102.0 compares information from restoration entry and port select logic 1106 to information on the write back bus 330 and selects one of the buses 330 or 332 for access, coupling the unit 1102 to the multiplexer 320. The selection is asserted as signals on lines S_WB_Bus0 and S_HR_Bus0.

At the time of restoration, each writeback bus is either idle or has a result from a functional unit. For each port, the port's associated RCLU 1102 does the following: 1) grants (i.e., enables) or denies the associated writeback bus 330 access to the port; 2) grants restoration bus 332 access to the port if the writeback bus is idle or its access is denied; and 3) disables a selected restoration entry from using any restoration bus (i.e., bars the entry from participating in restoration) based on a comparison of the entry with the writeback result for the port. A writeback bus is denied access to the port by the RCLU 1102 if the bus has a writeback result that is produced by an instruction which either 1) follows in the instruction sequence after the instruction which was interrupted (the "checkpoint"), or 2) occurs before the checkpoint, but will have its result overwritten by a restoration result due to the interrupt. Once denied, the same result will not be presented on the writeback bus in future arbitration. Denying a writeback bus access to a port tends also to condense the history buffer.

Referring ahead now to FIG. 13, aspects of port arbitration are summarized.

The upper right quadrant of FIG. 13 illustrates condition 1, wherein the writeback register pointer on a writeback bus matches the register pointer of a restoration entry, but the TID of the writeback bus does not match that of the restoration entry. This condition indicates that the restoration entry should hold the register content prior to the checkpoint, so the history restoration bus should be granted access to the register write port, preempting the writeback bus. That is, at the time the restoration logic seeks to restore the register, the functional unit which shares the same register file port is writing back to the same register, but not with the value needed to restore the processor state for the particular interrupt that has occurred.

The upper left quadrant of FIG. 13 illustrates condition 2, wherein the writeback TID of a writeback bus matches the TID of a restoration entry. This condition indicates that the writeback bus has the value expected by the restoration entry. That is, at the time the restoration logic seeks to restore a register with content that was altered by a certain instruction, a functional unit is seeking to write back the needed result for the same register and the same instruction. Rather than writing the result to the history buffer and then using this restoration content from the history buffer to write to the register, the writeback bus is granted access to the register writeback port and the result is written directly to the register from the functional unit. Meanwhile, the restoration entry is signaled not to participate in the restoration.

The lower left quadrant of FIG. 13 illustrates a condition, labeled as condition 3, which should not occur. That is, there should not be a situation where the write bus TID matches a restoration entry TID but the write bus data is for a different register than the restoration entry data. Nevertheless, the logic, as illustrated in FIG. 12, would grant access to the writeback bus for such a condition.

The lower right quadrant of FIG. 13 illustrates condition 4, wherein the writeback register pointer of a writeback bus matches none of the register pointers of the restoration entries, and the writeback TID matches none of the TID's of the restoration entries. This condition indicates that none of the instructions associated with the checkpoint and in sequence at or after the checkpoint would modify the register, which occurs when the data carried by the write back bus is the result of an instruction before the checkpoint. Therefore, the writeback bus is granted access to the register port.

FIG. 13 does not illustrate a fifth condition which also may occur. In condition 5 the writeback bus is idle. In this case the history buffer restoration bus is granted access to the register port.

Referring back now to FIG. 12, details of a typical restoration control logic unit ("RCLU") 1102 are shown. The RCLU 1102 has a bus select logic unit ("BSLU") 1202 for each of the k entries of the history buffer 400 of FIG. 4, so that each BSLU 1202 corresponds to one of the history buffer 400 entries. As previously described, each of the RCLU's 1102 corresponds to one of the result buses 330 and ports 1110 of FIG. 11. A BSLU 1202 has a first comparator 1204 and second comparator 1210 for comparing information asserted on the RCLU's corresponding result bus 330 with information in the BSLU's corresponding history buffer 400 entry. The first comparator 1204 compares TID's, and the second comparator compares register pointers (described also as the TR field 410 of the history buffer 400).

The output of the first comparator 1204, which is asserted if the TID on the result bus matches the TID of [the HB entry 400 for the BSLU 1202, and therefore is referred to as the TID match output, is input to OR gate 1220. The OR gate 1220 receives the TID match outputs from each of the k BSLU's 1202 in the RCLU 1102, so that, if the TID of any HB entry selected for restoring to a register matches the TID asserted on the write back bus 330, the output of the OR gate 1220 is asserted. Asserting the output of the OR gate 1220 grants priority to the write back bus 330.

The output of the second comparator 1210, is asserted if the register pointer on the result bus 330 matches the register pointer of the HB entry 400 for the BSLU 1202, and therefore is referred to as the register match output. The register match output feeds an inverter 1212, the output of which feeds an AND gate 1224, so that the input to the AND gate 1224 is asserted if the register pointer on the result bus and the register pointer of the HB entry do not match. The AND gate 1224 also receives the register match inputs from each of the other k BSLU's 1202 in the RCLU 1102, so that the output of the AND gate 1224 is asserted if there is no match among the register pointer on the result bus and any of the registers of the HB entries selected for restoration.

The AND gate 1224 output is also an input to the OR gate 1220, so that, if there is no match among the register pointer on the result bus and any of the registers of the HB entries selected for restoration, the OR gate 1220 output, S_WB_Bus, is also asserted, granting access for the writeback bus 330 to the port 1110.

The output of the first comparator 1204 also goes to inverter 1206, the output of which feeds to AND gate 1208. The other input to AND gate 1208 is the output of the second comparator 1210, so that the output of the AND gate 1208 is asserted if the TID on the result bus does not match the TID of the HB 400 entry for the BSLU 1202 and the register pointer on the result bus 330 matches the register pointer of the HB 400 entry.

The output of the AND gate 1208 feeds OR gate 1222, so that the output of the OR gate 1222, S_HR_Bus, is asserted if the output of the AND gate 1208 is asserted. The OR gate 1222 output being asserted grants access for the history restoration bus 332 to the port 1110. The OR gate 1222 also receives the AND gate 1208 outputs from each of the other k BSLU's 1202 in the RCLU 1102, so that if, for any of the k HB restoration entries, the TID on the result bus does not match the TID of an HB 400 restoration entry, and the register pointer on the result bus 330 matches the register pointer of an HB 400 restoration entry, then the output of the OR gate 1222 is asserted, granting access for the history restoration bus 332 to the port 1110. The OR gate 1222 also receives a Bus idle signal from the write back bus 330, so that the OR gate output is also asserted if the write back bus 330 is idle.

Each BSLU 1202 also includes logic for outputting a disable signal. For the ith BSLU 1202, i.e., BSLUi, the disable signal, maski, signals to mask restoration entry, HBEi, from participating in a restoration if the output of the first and second compares 1204 and 1210 indicate TID and R Ptr matches.

Summarizing, there is a Restoration Control Logic Unit 1102 for each of n ports 1110. Each of the n RCLU's 1102 has a Bus Selection Logic Unit 1202 for each of k restoration history buffer entries. An ith BSLU 1202, BSLUi, receives as an input for the ith HBE, HBEi, the TIDi and TRi (also referred to as register pointer i, or R Ptri) and produces, a disable signal, maski, for masking its restoration entry, HBEi, from participating in the restoration, and produces other outputs to elements of its associated RCLU 1102i. The RCLUi outputs bus select signals, S_WB_Busi and S_HR_Busi, for selecting a write back or history buffer restoration bus.

In addition to arbitrating access to register ports by the history buffer restoration and write back buses, additional logic is required to select a restoration entry for accessing a particular port. For selecting which restoration HBE to restore over which port, an RCLU 1102, RCLUi, sends a set of the k mask signals, mask 0 through mask k-1, from its k BSLU's 1202, and sends one bus select signal, S_HR_Bus i, to the Restoration Entry and Port Selection Logic Unit 1106. Thus, the REPSLU 1106 receives n sets of k mask signals, one set from each RCLU 1102, and receives n bus select signals, S_HR_Bus, one from each RCLU 1102, wherein a bus select signal, S_HR_busi, corresponds to one of the sets of k mask signals. For each bus select signal asserted, the REPSLU 1106 selects one of the restoration entries, HBE0 through HBEk-1, using the set of mask signals corresponding to the bus select signal to select one of the restoration entries that is not masked.

Figure 14:
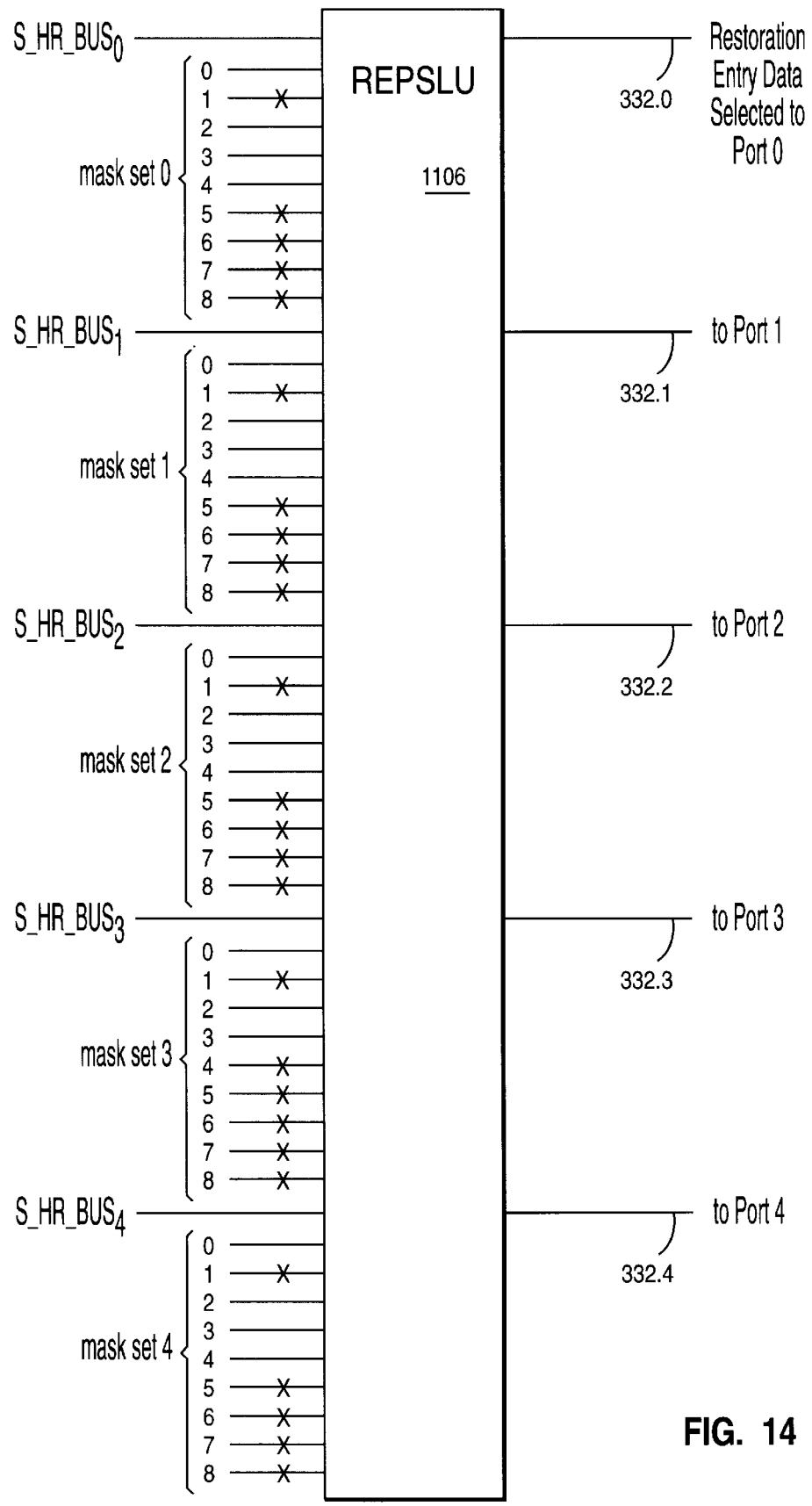
FIG. 14 illustrates signals to the restoration entry and port selection logic unit, including an indication of signals disabling certain history buffer entries.

FIG. 14 illustrates a case where the number of ports, n, is 5 and the number of history buffer entries, k, is 9, of which three of the HBE's—HBE0, HBE1 and HBE3—are selected as restoration entries. In this example ports 0 and restoration HBE1 have a TID match so that HBE1 is disabled (i.e., masked) from participating (shown by "x" on the HBE1 line). Therefore, in this case only HBE0 or HBE3 would participate in restoration on any of the ports. (Since HBE2, and HBE4 through HBE8 are not selected for restoration these HBE's are shown as disabled for all mask sets.)

REPSLU 1106 identifies a number of "free" ports which may be used for restoration in response to the bus select signals. The S_HR_bus signals, when on, identify free ports. For the example, assume that access to ports 1 and 3 has been granted to the ports 1 and 3 writeback buses, rather than the history restoration bus, so that ports 0, 2 and 4 are free, but ports 1 and 3 are not.

REPSLU 1106 identifies all the non-masked HBE's which are restoration HBE's not masked on any port. The logic can be implemented by ANDing all the inverted k-bit masks from the RCLU's 1102 to produce a derivative k bit mask. (In the derived k bit mask, a one bit identifies a non-masked HBE.) The REPSLU 1106 matches the free ports and the non-masked HBE's in ascending order of the ports and the HBE's. Thus, in the example, HBE0 is restored over port 0, because HBE0 is the lowest order, nonmasked HBE and port 0 is the lowest order free port. Then HBE3 is restored over port 2, because HBE3 is the next non-masked HBE and port 2 is the next free port.

Figure 15:
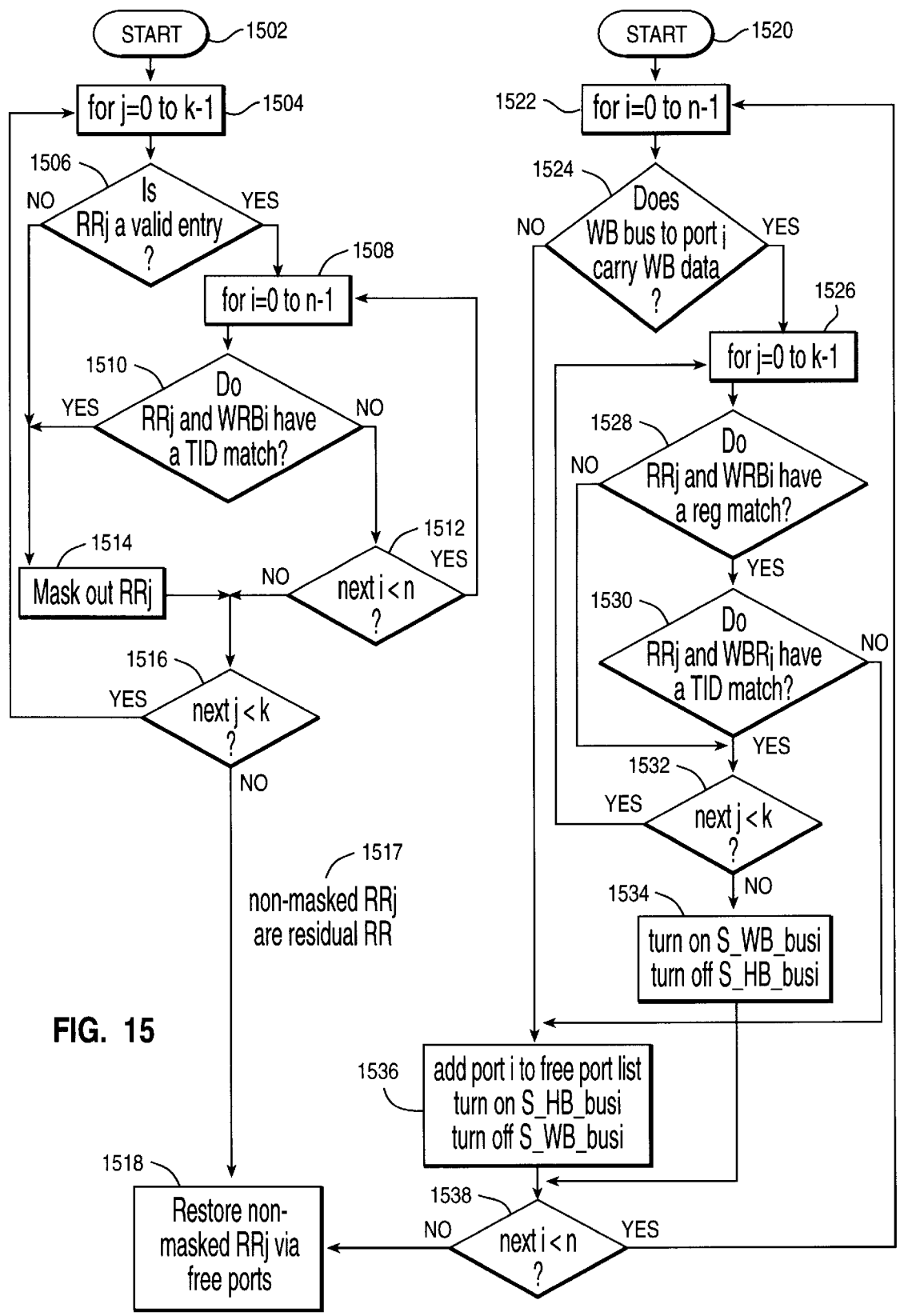
FIG. 15 is a flow chart illustrating aspects of arbitration and restoration logic.

Referring now to FIG. 15, aspects of arbitration and restoration logic are illustrated in the style of a sequential flow chart. It should be understood that many aspects of the preferred logic are implemented in combinational logic which does not process information in the serial fashion indicated by this flow chart. Nevertheless, the chart illustrates concepts which are embodiments of the invention, and does illustrate that two major logic processes occur concurrently as shown by starting one logic branch at 1502 and another in parallel at 1520.

Prior to the logic of FIG. 15, as has been described previously, entries in the history buffer are selected for restoration. It is assumed in FIG. 15 that k entries have been thus selected, and that there are n ports and associated writeback buses. These k selected restoration results are referred to in FIG. 15 as "RR's".

Starting at logic branch 1502, for the RR's (i.e., RR0 to RRk-1 shown in terms of an iterative for-next loop at 1504 and 1516), a comparison is made at 1510 to each of the 0 to n-1 writeback results (i.e., WBR0 to WBRn-1 shown in terms of an interative for-next loop at 1508 and 1512). If a TID of one of the RR's matches that of one of the WBR's the RR is masked out at 1514. The non-masked RR's remaining after all the comparisons are made are referred to as "residual RR's" at 1517.

Meanwhile, at logic branch 1520, for the n writeback buses (i.e., WB bus 0 to n-1 shown in terms of an interative for-next loop at 1522 and 1538), a determination is made at 1524 as to whether the bus is idle. If the bus is idle then the associated port is added to a list of free ports at 1536. For the k RR's (i.e., RR0 to RRk-1 shown in terms of an iterative for-next loop at 1526 and 1532), a comparison is made to the WBR's at 1528. If at 1528 it is determined that there is a TR match, then a comparison is made at 1530 to determine if there is a TID match. Otherwise, the port is noted at 1534 as busy. If there is no TID match, then the associated port is added to the free port list at 1536. Otherwise, the associated port is noted at 1534 as busy.

Once all the ports have been noted as either busy or free and all the residual RR's determined, the residual RR's are restored via the free ports at 1518.

As previously stated, the invention is not limited to the details of the embodiment described above, and is capable of use in various other combinations and of modifications within the scope of the inventive concept as expressed herein. The invention is intended to be defined broadly in accordance with the following claims.

What is claimed is:

1. In a data processing system using a number of registers for processing instructions and having at least one port for accessing the registers, a method for writing information to the registers, the method comprising:

a) repeatedly accessing the at least one port for writing successive results from at least one functional unit to the registers;

b) storing, in a storage element, certain of the results for restoring to the registers;

c) accessing the at least one port, in response to an interruption, for restoring at least one of the stored results to at least one of the registers from the storage element, wherein one access, i), which is one of the accesses for writing at least one of the results to the at least one of the registers from the at least one functional unit, and another access, ii), which is the access for restoring at least one of the stoked results to at least one of the registers, compete for concurrent access to the at least one port; and d) arbitrating between the competing accesses to the at least one port, which includes comparing the at least one stored result from the storage element with the at least one result from the at least one functional unit.

2. The method of claim 1, wherein results include identification of the instruction associated with the result (a "TID"), and a register targeted by the result (a "TR"), and wherein the comparing includes comparing TID's d TR's for the results.

3. The method of claim 2, wherein d) comprises the step of:

b1) selecting, in response to the interruption, only certain of the stored results for restoring;

and wherein, for the competing accesses; the arbitration of step c) comprises the step of:

c1) selecting, for access to the at least one port, the access i) when the result from the at least one functional unit targets such a register not targeted by any of the selected, stored results.

4. The method of claim 3, wherein step c) comprises the step of:

c2) selecting the access i) for access to the port when the access i) targets a register targeted by the access ii) and the accesses i) and ii) are both for a same instruction, and selecting the access ii) for access to the port when the access i) targets a register targeted by the access ii) and the accesses i) and ii) are not both for a same instruction.

5. The method of claim 1, wherein the at least one port includes at least a first and second port, and wherein, in a first instance one of the accesses i) may access the first port concurrently with one of the accesses ii) accessing the second port, and in a second instance one of the accesses i) may access the second port concurrently with one of the accesses ii) accessing the first port.

6. The method of claim 1, wherein the at least one port is limited to a certain number of ports, and, in at least some instances, the accesses i) and ii), competing for concurrent access to the ports, are of a number which exceeds the certain number of ports.

7. In a data processing system using a number of registers for processing instructions and having at least one port for accessing the registers, a system for writing information to the registers, the system comprising:

a) means for repeatedly accessing the at least one port for writing successive execution results from at least one functional unit to the registers;

b) means for storing, in a storage element, certain of the results for restoring to the registers;

c) means for accessing the at least one port, in response to an interruption, for restoring at least one of the stored results to at least one of the registers from the storage element, wherein one access, i), which is one of the accesses for writing at least one of the results to the at least one of the registers from the at least one functional unit, and another access, ii), which is the access for restoring at least one of the stored results to at least one of the registers, compete for concurrent access to the at least one port; and d) means for arbitrating between the competing accesses to the at least one port, which includes means for comparing the at least one stored result from the storage element with the at least one result from the at least one functional unit.

8. The system of claim 7, wherein results include identification of the instruction associated with the result (a "TID"), and a register targeted by the result (a "TR"), and wherein the means for arbitrating includes means for comparing TID's and TR's for the results.

9. The system of claim 8, comprising:

e) means for selecting, in response to the interruption, only certain of the stored results for restoring; and wherein the means for arbitrating, d), comprises:

d1) means for selecting, for access to the at least one port, the access i) when the result from the at least one functional unit targets such a register not targeted by any of the selected, stored results.

10. The system of claim 9, wherein the means for arbitrating comprises:

d2) means for selecting the access i) for access to the port when the access i) targets a register targeted by the access ii) and the accesses i) and ii) are both for a same instruction, and selecting the access ii) for access to the port when the access i) targets a register targeted by the access ii) and the accesses i) and ii) are not both for a same instruction.

11. The system of claim 7, wherein the at least one port includes at least a first and second port, and wherein, in a first instance one of the accesses i) may access the first port concurrently with one of the accesses ii) accessing the second port, and in a second instance one of the accesses i) may access the second port concurrently with one of the accesses ii) accessing the first port.

12. The system of claim 7, wherein the at least one port is limited to a certain number of ports, and, in at least some instances, the accesses i) and ii), competing for concurrent access to the ports, are of a number which exceeds the certain number of ports.

* * * * *